United States Patent
Yao et al.

(10) Patent No.: US 12,107,425 B2
(45) Date of Patent: Oct. 1, 2024

(54) PHOTOVOLTAIC POWER GENERATION SYSTEM AND METHOD

(71) Applicant: Huawei Digital Power Technologies Co., Ltd., Shenzhen (CN)

(72) Inventors: Xiaofeng Yao, Shenzhen (CN); Yang Cheng, Xi'an (CN); Guozhao Duan, Xi'an (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 17/980,812

(22) Filed: Nov. 4, 2022

(65) Prior Publication Data
US 2023/0058643 A1 Feb. 23, 2023

Related U.S. Application Data

(63) Continuation of application No. PCT/CN2021/089128, filed on Apr. 23, 2021.

(30) Foreign Application Priority Data

May 8, 2020 (CN) .......................... 202010380961.5

(51) Int. Cl.
*H02J 3/38* (2006.01)
*H02J 3/00* (2006.01)
*H02M 1/32* (2007.01)

(52) U.S. Cl.
CPC .......... *H02J 3/381* (2013.01); *H02J 3/00125* (2020.01); *H02M 1/32* (2013.01); *H02J 2300/24* (2020.01)

(58) Field of Classification Search
CPC .... H02J 3/381; H02J 3/00125; H02J 2300/24; H02M 1/0077; H02M 1/32
(Continued)

(56) References Cited

U.S. PATENT DOCUMENTS 8,842,397 B2 9/2014 Fahrenbruch et al.
9,438,037 B2 9/2016 Ledenev et al.
(Continued)

FOREIGN PATENT DOCUMENTS

CN 102291052 A 12/2011
CN 103780071 A 5/2014
(Continued)

*Primary Examiner* — Hal Kaplan
(74) *Attorney, Agent, or Firm* — WOMBLE BOND DICKINSON (US) LLP

(57) ABSTRACT

This application discloses a photovoltaic power generation system and method, and the system includes an inverter and at least one shutdown apparatus. A type of the shutdown apparatus includes at least one of a shutdown device and an optimizer; and an input end of each shutdown apparatus is connected to a corresponding PV module, and power of the corresponding PV module is output. In the system, when a parameter of the inverter meets a preset condition, some shutdown apparatuses are turned off to lower an input voltage of the inverter, and ensure that an input end of the inverter has a direct current source, and the system can operate as usual; and the preset condition is that the input voltage of the inverter is greater than a first preset voltage, or an input current of the inverter is less than a first preset current.

15 Claims, 15 Drawing Sheets

(58) Field of Classification Search
USPC .......................................................... 307/84
See application file for complete search history.

(56) References Cited

U.S. PATENT DOCUMENTS

| | | | |
|---|---|---|---|
| 9,870,016 | B2 | 1/2018 | Adest et al. |
| 11,271,404 | B2* | 3/2022 | Yang .................... H02J 3/0012 |
| 2008/0150366 | A1 | 6/2008 | Adest et al. |
| 2009/0206666 | A1 | 8/2009 | Sella et al. |
| 2017/0222542 | A1 | 8/2017 | Adest et al. |
| 2019/0363672 | A1 | 11/2019 | Fischer et al. |
| 2020/0106272 | A1* | 4/2020 | Yu ........................... H02S 40/32 |
| 2020/0343730 | A1* | 10/2020 | Zhu ........................ H02J 3/388 |

FOREIGN PATENT DOCUMENTS

| | | |
|---|---|---|
| CN | 104333213 A | 2/2015 |
| CN | 105723614 A | 6/2016 |
| CN | 106877311 A | 6/2017 |
| CN | 207021959 U | 2/2018 |
| CN | 108539789 A | 9/2018 |
| CN | 108964136 A | 12/2018 |
| CN | 109713710 A | 5/2019 |
| CN | 111668868 A | 9/2020 |
| DE | 102010009120 A1 | 8/2011 |
| EP | 3291309 A1 | 3/2018 |
| EP | 3382871 A1 | 10/2018 |
| WO | 2010078303 A2 | 7/2010 |
| WO | 2012068618 A1 | 5/2012 |
| WO | 2017214714 A1 | 12/2017 |

* cited by examiner

PHOTOVOLTAIC POWER GENERATION SYSTEM AND METHOD

CROSS-REFERENCE TO RELATED APPLICATIONS

This application is a continuation of International Application No. PCT/CN2021/089128, filed on Apr. 23, 2021, claims priority to Chinese Patent Application No. 202010380961.5, filed on May 8, 2020. The disclosures of the aforementioned applications are hereby incorporated by reference in their entireties.

TECHNICAL FIELD

This application relates to the field of photovoltaic power generation technologies, and in particular, to a photovoltaic power generation system and method.

BACKGROUND

With the aggravation of energy shortage and environmental pollution in modern society, photovoltaic power as a renewable energy source attracts wide attention of all circles.

Currently, solar energy is generally converted into electric energy by using a photovoltaic (PV) module. Because the PV module outputs a direct current, an inverter 201 is needed to convert the direct current into an alternating current and transmit the alternating current to an alternating current power grid. In actual application, output ends of a plurality of PV modules are usually connected in series to form a PV string. Refer to FIG. 1. For example, a PV string 101 and a PV string 102 are included, and a plurality of PV strings are connected in parallel to an input end of the inverter 201.

However, an output voltage of the PV string is excessively high in some cases, and a relatively high voltage may cause an inverter to operate abnormally or even be damaged. At present, a shutdown apparatus is configured for each PV module, so as to cut off an input voltage of the inverter when the input voltage is relatively high. A shutdown device is an output-controllable apparatus, and can control whether the shutdown device has an output voltage based on whether the shutdown device is turned off.

FIG. 2 is a schematic diagram of a photovoltaic power generation system with a shutdown device.

A PV string 101 is used as an example. A photovoltaic power generation system 200 includes a shutdown device 202 and an inverter 201, in which there are n shutdown devices 202. Usually, the shutdown device 202 is in a one-to-one correspondence with the PV module, and n is an integer greater than or equal to 1. An input end of each shutdown device 202 is connected to a corresponding PV module, and output ends of all shutdown devices 202 are connected in series to the input end of the inverter 201. After all the shutdown devices 202 are turned off, output voltages of all the shutdown devices 202 are 0. Therefore, an input voltage of the inverter 201 is 0, so as to ensure that the input voltage of the inverter 201 does not exceed a safe voltage.

However, although the photovoltaic power generation system can ensure that the input voltage of the inverter is not excessively high, once protection is triggered, the input voltage of the inverter is 0, and the photovoltaic power generation system cannot continue to generate power, causing a loss.

SUMMARY

To resolve the foregoing technical problem, this application provides a photovoltaic power generation system and method, so as to ensure that an input voltage of an inverter does not exceed a safe voltage, and ensure that the photovoltaic power generation system can operate normally.

According to a first aspect, an embodiment of this application provides a photovoltaic power generation system. The system includes an inverter and at least one shutdown apparatus, and a type of the shutdown apparatus includes at least one of an optimizer or a shutdown device. In other words, the shutdown apparatus has three forms. A first form is that the shutdown apparatus is only the optimizer, a second form is that the shutdown apparatus is only the shutdown device, and a third form is that the shutdown apparatus includes both the optimizer and the shutdown apparatus. An input end of each shutdown apparatus is connected to a corresponding PV module, and power of the corresponding PV module is output. There are two cases based on whether all PV modules are configured with shutdown apparatuses, and the following separately describes the two cases.

A first case: An output end of each PV module is configured with the shutdown apparatus.

Output ends of all PV modules are connected to corresponding shutdown apparatuses, and output ends of the shutdown apparatuses are connected in series to an input end of the inverter.

When an input voltage of the inverter is greater than a first preset voltage or an input current of the inverter is less than a first preset current, some shutdown apparatuses are turned off to lower the input voltage of the inverter. An output voltage of the shutdown apparatus that is turned off is lowered, and therefore the input voltage of the inverter is lowered. In addition, a shutdown apparatus that is not turned off can ensure that the inverter has the input voltage, so that the photovoltaic power generation system can operate normally.

A second case: Output ends of some PV modules are not configured with the shutdown apparatuses.

The PV module includes a first part of PV modules that are configured with the shutdown apparatuses and a second part of PV modules that are not configured with the shutdown apparatuses. An output end of each PV module in the first part of PV modules is connected to an input end of a corresponding shutdown apparatus, and input ends of all shutdown apparatuses are connected in series to form a first output end. The second part of PV modules includes at least one PV module. When the second part of PV modules includes one PV module, the first output end is connected to the input end of the inverter after being connected in series to the PV module. When the second part of PV modules includes a plurality of PV modules, all PV modules in the second part of PV modules are directly connected in series to form a second output end, and the first output end is connected to the input end of the inverter after being connected in series to the second output end.

When the input voltage of the inverter is greater than the first preset voltage or the input current of the inverter is less than the first preset current, some shutdown apparatuses are turned off or all shutdown apparatuses are turned off, the output voltage of the shutdown apparatus that is turned off is lowered, and therefore the input voltage of the inverter is lowered. In addition, a PV module corresponding to the shutdown apparatus that is not turned off and the second part of PV modules can ensure that the inverter has the input voltage, so that the photovoltaic power generation system can operate normally.

In one embodiment, the system may further include a controller, and the controller may be a controller independent of the inverter or a controller of the inverter. The shutdown apparatus in this system has two types, including both the shutdown device and the optimizer. The controller is specifically configured to: when it is determined that the input voltage of the inverter is greater than a second preset voltage and less than the first preset voltage, control an output voltage of the optimizer to be lowered, to lower the input voltage of the inverter. The second preset voltage is less than the first preset voltage.

When a parameter of the inverter of the system meets a preset condition, the input voltage of the inverter is excessively high, and the controller controls the output voltage of the optimizer to be lowered, so as to lower the input voltage of the inverter. In addition, the input end of the inverter continues to have a direct current input, so as to ensure that the input voltage of the inverter is not excessively high, and the photovoltaic power generation system can operate normally.

In one embodiment, after the controller controls the output voltage of the optimizer to be lowered, the following cases may occur: The input voltage of the inverter does not decrease below the second preset voltage but instead exceeds the first preset voltage; or the input current of the inverter is less than the first preset current. In other words, when the parameter of the inverter meets the preset condition, the controller controls the shutdown device to be turned off to lower the input voltage of the inverter. The optimizer is adjusted first, so that the input voltage of the inverter can be smoothly lowered, making the inverter more stable. If an adjustment capability of the optimizer is insufficient to lower the input voltage, the shutdown device is then controlled to be turned off, so as to lower the input voltage of the inverter.

In one embodiment, the shutdown device includes a first switching transistor and a first diode. A first end of the first switching transistor is connected to a positive electrode of the PV module, and a second end of the first switching transistor is connected to a positive output end of the shutdown device. A cathode of the first diode is connected to the positive output end of the shutdown device, and an anode of the first diode is connected to a negative output end of the shutdown device. When the shutdown device is turned off, the first switching transistor is turned off. When the shutdown device is turned on, the first switching transistor is turned on.

When the shutdown device is turned off, the first switching transistor is turned off, an output voltage of the shutdown device is lowered, and therefore the input voltage of the inverter is lowered. Because the first diode is turned on when the first switching transistor is turned off, output power of another PV module in a same string is not affected. When the shutdown device is turned on, the first switching transistor is turned on, and energy output by a PV module connected to the shutdown device can be normally transferred to the inverter.

In one embodiment, the shutdown device includes a first switching transistor and a second switching transistor. A first end of the first switching transistor is connected to a positive electrode of the PV module, and a second end of the first switching transistor is connected to a positive output end of the shutdown device. A first end of the second switching transistor is connected to the positive output end of the shutdown device, and a second end of the second switching transistor is connected to a negative output end of the shutdown device. The second switching transistor includes an anti-parallel diode. When the shutdown device is turned off, the first switching transistor is turned off, and the second switching transistor is turned on. When the shutdown device is turned on, the first switching transistor is turned on, and the second switching transistor is turned off.

When the shutdown device is turned off, the first switching transistor is turned off, the second switching transistor is turned on, an output voltage of the shutdown device is lowered, and therefore the input voltage of the inverter is lowered. Because the second switching transistor is turned on when the first switching transistor is turned off, output power of another PV module in a same string is not affected. When the shutdown device is turned on, the first switching transistor is turned on, the second switching transistor is turned off, and energy output by a PV module connected to the shutdown device can be normally transferred to the inverter.

According to a second aspect, an embodiment of this application provides a photovoltaic power generation system, which not only can turn off a shutdown apparatus based on a parameter of an inverter, but also can turn off the shutdown apparatus based on a parameter of the shutdown apparatus. The system includes an inverter and at least one shutdown apparatus, and a type of the shutdown apparatus includes at least one of an optimizer or a shutdown device, that is, the shutdown apparatus has three forms. A first form is that the shutdown apparatus is only the optimizer, a second form is that the shutdown apparatus is only the shutdown device, and a third form is that the shutdown apparatus includes both the optimizer and the shutdown apparatus. An input end of each shutdown apparatus is connected to a corresponding PV module, and power of the corresponding PV module is output. There are two cases based on whether all PV modules are configured with shutdown apparatuses, and the following separately describes the two cases.

A first case: An output end of each PV module is configured with the shutdown apparatus.

Output ends of all PV modules are connected to corresponding shutdown apparatuses, and output ends of the shutdown apparatuses are connected in series to an input end of the inverter.

When a voltage of the shutdown apparatus is greater than a preset threshold voltage or a current of the shutdown apparatus is less than a preset threshold current, some shutdown apparatuses are turned off to lower an input voltage of the inverter. An output voltage of the shutdown apparatus that is turned off is lowered, and therefore the input voltage of the inverter is lowered. In addition, a shutdown apparatus that is not turned off can ensure that the inverter has the input voltage, so that the photovoltaic power generation system can operate normally.

A second case: Output ends of some PV modules are not configured with the shutdown apparatuses.

The PV module includes a first part of PV modules that are configured with the shutdown apparatuses and a second part of PV modules that are not configured with the shutdown apparatuses. An output end of each PV module in the first part of PV modules is connected to an input end of a corresponding shutdown apparatus, and input ends of all shutdown apparatuses are connected in series to form a first output end. The second part of PV modules includes at least one PV module. When the second part of PV modules includes one PV module, the first output end is connected to the input end of the inverter after being connected in series to the PV module. When the second part of PV modules includes a plurality of PV modules, all PV modules in the second part of PV modules are directly connected in series to form a second output end, and the first output end is connected to the input end of the inverter after being connected in series to the second output end.

When the voltage of the shutdown apparatus is greater than the preset threshold voltage or the current of the shutdown apparatus is less than the preset threshold current, some shutdown apparatuses are turned off or all shutdown apparatuses are turned off, the output voltage of the shutdown apparatus that is turned off is lowered, and therefore the input voltage of the inverter is lowered. In addition, a PV module corresponding to the shutdown apparatus that is not turned off and the second part of PV modules can ensure that the inverter has the input voltage, so that the photovoltaic power generation system can operate normally.

In one embodiment, when the type of the shutdown apparatus includes both the shutdown device and the optimizer, the voltage of the shutdown apparatus is an input voltage or an output voltage of the shutdown apparatus, and the current of the shutdown apparatus is an input current or an output current of the shutdown apparatus.

In one embodiment, a preset threshold voltage corresponding to the optimizer is a preset optimizer threshold voltage. When an input voltage or an output voltage of the optimizer is greater than the preset optimizer threshold voltage, the optimizer lowers the output voltage of the optimizer, so as to lower the input voltage of the inverter. Preset optimizer threshold voltages corresponding to at least two optimizers are different in magnitude, so that the optimizer may adjust voltages in batches, and at least one optimizer in the photovoltaic system has the output voltage, thereby ensuring that the input end of the inverter continues to have a direct current input, and the photovoltaic system can operate normally.

In one embodiment, a preset threshold voltage corresponding to the shutdown device is a preset shutdown threshold voltage. When an input voltage or an output voltage of the shutdown device is greater than the preset shutdown threshold voltage, the shutdown device is turned off, so as to lower the input voltage of the inverter. Preset shutdown threshold voltages corresponding to at least two shutdown devices are different in magnitude, and different preset shutdown threshold voltages may be used to adjust different shutdown devices, so that at least one shutdown device in the photovoltaic system has the output voltage, thereby ensuring that the input end of the inverter continues to have a direct current input, and the photovoltaic system can operate normally.

In one embodiment, the shutdown device not only can turn itself off based on an input voltage or an output voltage of the shutdown device, but also can turn itself off based on an output current of the shutdown device. The shutdown device is further configured to turn off when an output current of the shutdown device is less than a first preset shutdown threshold current, and turn on when the output current of the shutdown device is greater than a second preset shutdown threshold current. A current that triggers turn-on of the shutdown device and a current that triggers turn-off of the shutdown device are different for convenience of setting a particular return difference. First preset shutdown threshold currents corresponding to at least two shutdown devices are different in magnitude, second preset shutdown threshold currents corresponding to at least two shutdown devices are different in magnitude, and the first preset shutdown threshold current is less than the second preset shutdown threshold current.

In one embodiment, the shutdown device includes a first switching transistor and a first diode. A first end of the first switching transistor is connected to a positive electrode of the PV module, and a second end of the first switching transistor is connected to a positive output end of the shutdown device. A cathode of the first diode is connected to the positive output end of the shutdown device, and an anode of the first diode is connected to a negative output end of the shutdown device. When the shutdown device is turned off, the first switching transistor is turned off. When the shutdown device is turned on, the first switching transistor is turned on.

When the shutdown device is turned off, the first switching transistor is turned off, the output voltage of the shutdown device is lowered, and therefore the input voltage of the inverter is lowered. Because the first diode is turned on when the first switching transistor is turned off, output power of another PV module in a same string is not affected. When the shutdown device is turned on, the first switching transistor is turned on, and energy output by a PV module connected to the shutdown device can be normally transferred to the inverter.

In one embodiment, the shutdown device includes a first switching transistor and a second switching transistor. A first end of the first switching transistor is connected to a positive electrode of the PV module, and a second end of the first switching transistor is connected to a positive output end of the shutdown device. A first end of the second switching transistor is connected to the positive output end of the shutdown device, and a second end of the second switching transistor is connected to a negative output end of the shutdown device. The second switching transistor includes an anti-parallel diode. When the shutdown device is turned off, the first switching transistor is turned off, and the second switching transistor is turned on. When the shutdown device is turned on, the first switching transistor is turned on, and the second switching transistor is turned off.

When the shutdown device is turned off, the first switching transistor is turned off, the second switching transistor is turned on, the output voltage of the shutdown device is lowered, and therefore the input voltage of the inverter is lowered. Because the second switching transistor is turned on when the first switching transistor is turned off, output power of another PV module in a same string is not affected. When the shutdown device is turned on, the first switching transistor is turned on, the second switching transistor is turned off, and energy output by a PV module connected to the shutdown device can be normally transferred to the inverter.

According to a third aspect, an embodiment of this application provides a photovoltaic power generation control method, applied to the photovoltaic power generation system provided in the embodiment of the first aspect. There are two cases based on whether all PV modules are configured with shutdown apparatuses, and the following separately describes the two cases.

A first case: An output end of each PV module is configured with the shutdown apparatus.

When an input voltage of an inverter is greater than a first preset voltage or an input current of the inverter is less than a first preset current, some shutdown apparatuses are turned off to lower the input voltage of the inverter. An output voltage of the shutdown apparatus that is turned off is lowered, and therefore the input voltage of the inverter is lowered. In addition, a shutdown apparatus that is not turned off can ensure that the inverter has the input voltage, so that the photovoltaic power generation system can operate normally.

A second case: Output ends of some PV modules are not configured with the shutdown apparatuses.

In one embodiment, when an input voltage of the inverter is greater than a first preset voltage or an input current of the inverter is less than a first preset current, some shutdown apparatuses are turned off or all shutdown apparatuses are turned off, an output voltage of a shutdown apparatus that is turned off is lowered, and therefore the input voltage of the inverter is lowered. In addition, a PV module corresponding to the shutdown apparatus that is not turned off and a second part of PV modules can ensure that the inverter has the input voltage, so that the photovoltaic power generation system can operate normally.

By using the foregoing photovoltaic power generation control method, when a parameter of the inverter meets a preset condition, the input voltage of the inverter is excessively high, and the shutdown apparatus is turned off to lower the input voltage of the inverter. In addition, an input end of the inverter continues to have a direct current input, so as to ensure that the input voltage of the inverter does not exceed a safe voltage, and the photovoltaic power generation system can operate normally.

In one embodiment, when a type of the shutdown apparatus includes both an optimizer and a shutdown device, and when the input voltage of the inverter is greater than a second preset voltage and less than the first preset voltage, an output voltage of the optimizer is adjusted to lower the input voltage of the inverter. The second preset voltage is less than the first preset voltage.

By using the foregoing photovoltaic power generation control method, when the input voltage of the inverter is greater than the second preset voltage and less than the first preset voltage, the output voltage of the optimizer is adjusted, and the output voltage of the optimizer may be adjusted smoothly step by step, instead of directly turning off the output like the shutdown device. Therefore, the optimizer is adjusted first, so that the input voltage of the inverter can be smoothly lowered, making the inverter more stable.

According to a fourth aspect, an embodiment of this application provides a photovoltaic power generation control method, which is applied to the photovoltaic power generation system provided in the embodiment of the second aspect. According to the method, a shutdown apparatus can be turned off based on a parameter of an inverter, and the shutdown apparatus can be alternatively turned off based on a parameter of the shutdown apparatus. When a voltage of the shutdown apparatus is greater than a preset threshold voltage or a current of the shutdown apparatus is less than a preset threshold current, the shutdown apparatus is turned off to lower an input voltage of the inverter. In addition, an input end of the inverter continues to have a direct current input, so as to ensure that the input voltage of the inverter does not exceed a safe voltage, and the photovoltaic power generation system can operate normally.

This application has at least the following advantages: The photovoltaic power generation system provided in this embodiment of this application includes the inverter and at least one shutdown apparatus. A type of the shutdown apparatus includes at least one of the shutdown device and the optimizer. An input end of each shutdown apparatus is connected to a corresponding PV module, and power of the corresponding PV module is output. There are two cases based on whether all PV modules are configured with shutdown apparatuses: A first case is that an output end of each PV module is configured with the shutdown apparatus, and a second case is that output ends of some PV modules are not configured with the shutdown apparatuses. The following separately describes the two cases. A first case: Output ends of all PV modules are connected to corresponding shutdown apparatuses, and output ends of the shutdown apparatuses are connected in series to an input end of the inverter. When the parameter of the inverter meets a preset condition, some shutdown apparatuses are turned off to lower the input voltage of the inverter. A second case: The output ends of some PV modules are connected to corresponding shutdown apparatuses, and an output end of a PV module that is not configured with the shutdown apparatus is connected to the input end of the inverter after being connected in series to an output end of the shutdown apparatus. When the parameter of the inverter meets the preset condition, some shutdown apparatuses are turned off or all shutdown apparatuses are turned off to lower the input voltage of the inverter. The preset condition is that the input voltage of the inverter is greater than a first preset voltage, or an input current of the inverter is less than a first preset current.

By using the foregoing photovoltaic power generation system, when the parameter of the inverter meets the preset condition, the input voltage of the inverter exceeds the safe voltage, and the shutdown apparatus is turned off to lower the input voltage of the inverter. In addition, the voltage input end of the inverter continues to have the direct current input, so as to ensure that the input voltage of the inverter does not exceed the safe voltage, and the photovoltaic power generation system can operate normally. The following separately describes the two cases of whether all the PV modules are configured with the shutdown apparatuses.

A first case: When all the PV modules are configured with the shutdown apparatuses, the input voltage of the inverter is a sum of output voltages of all the shutdown apparatuses. Some shutdown apparatuses are turned off, an output voltage of a shutdown apparatus that is turned off is lowered, and therefore the input voltage of the inverter is lowered. In addition, a shutdown apparatus that is not turned off can ensure that the inverter has the input voltage, so that the photovoltaic power generation system can operate normally.

A second case: When some PV modules are configured with the shutdown apparatuses, the input voltage of the inverter is a sum of the output voltages of all the shutdown apparatuses and the output voltage of the PV module that is not configured with the shutdown apparatus. Some shutdown apparatuses are turned off or all shutdown apparatuses are turned off, the output voltage of the shutdown apparatus that is turned off is lowered, and therefore the input voltage of the inverter is lowered. In addition, the shutdown apparatus that is not turned off and the PV module that is not configured with the shutdown apparatus can ensure that the inverter has the input voltage, so that the photovoltaic power generation system can operate normally.

DESCRIPTION OF EMBODIMENTS

To make a person skilled in the art better understand technical solutions provided in embodiments of this application, the following clearly and completely describes the technical solutions in embodiments of this application with reference to the accompanying drawings in embodiments of this application.

Embodiment 1 of a Photovoltaic Power Generation System

The photovoltaic power generation system provided in this embodiment includes an inverter and at least one shutdown apparatus, and a type of the shutdown apparatus is at least one of a shutdown device and an optimizer. The shutdown apparatus may be integrated with a PV module or may be independent of a PV module. The following uses an example in which the shutdown apparatus is independent of the PV module for description.

An input end of each shutdown apparatus is connected to a corresponding PV module, and power of the corresponding PV module is output.

When a parameter of the inverter meets a preset condition, the shutdown apparatus is turned off, so as to lower an input voltage of the inverter. However, not all PV modules break a direct or an indirect connection to the inverter, and an input end of the inverter continues to have a direct current input, so that the photovoltaic power generation system can continue to operate normally.

There may be two cases based on whether all the PV modules are configured with shutdown apparatuses. A first case is that an output end of each PV module is configured with the shutdown apparatus, and a second case is that output ends of some PV modules are not configured with the shutdown apparatuses. The PV module is configured with the shutdown apparatus, and the PV module may be in a one-to-one correspondence with the shutdown apparatus, or a plurality of PV modules may correspond to one shutdown apparatus.

Figure 1:
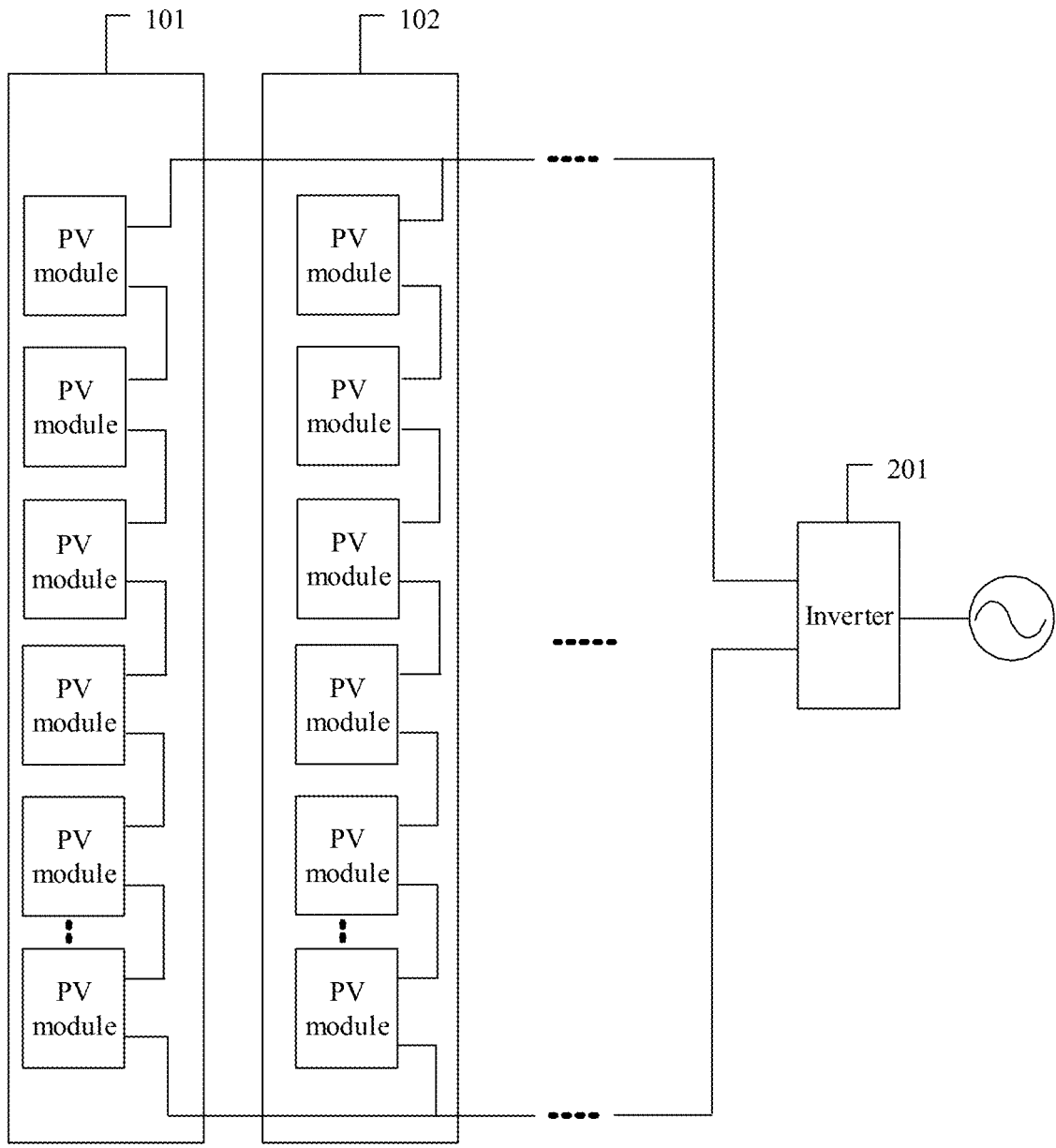
FIG. 1 is a schematic diagram of supplying power to an alternating current power grid by a PV module.
Figure 2:
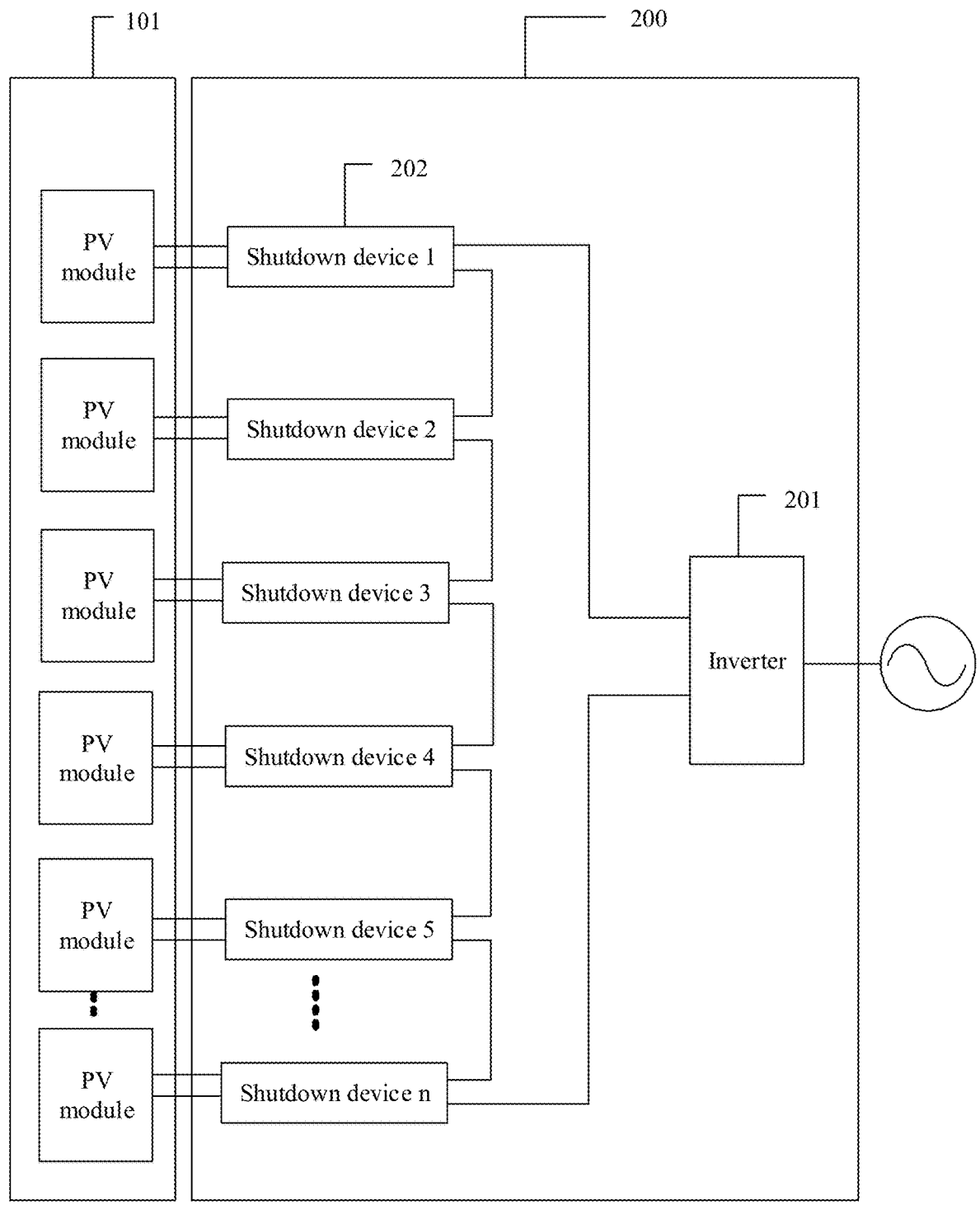
FIG. 2 is a schematic diagram of a photovoltaic power generation system.
Figure 3:
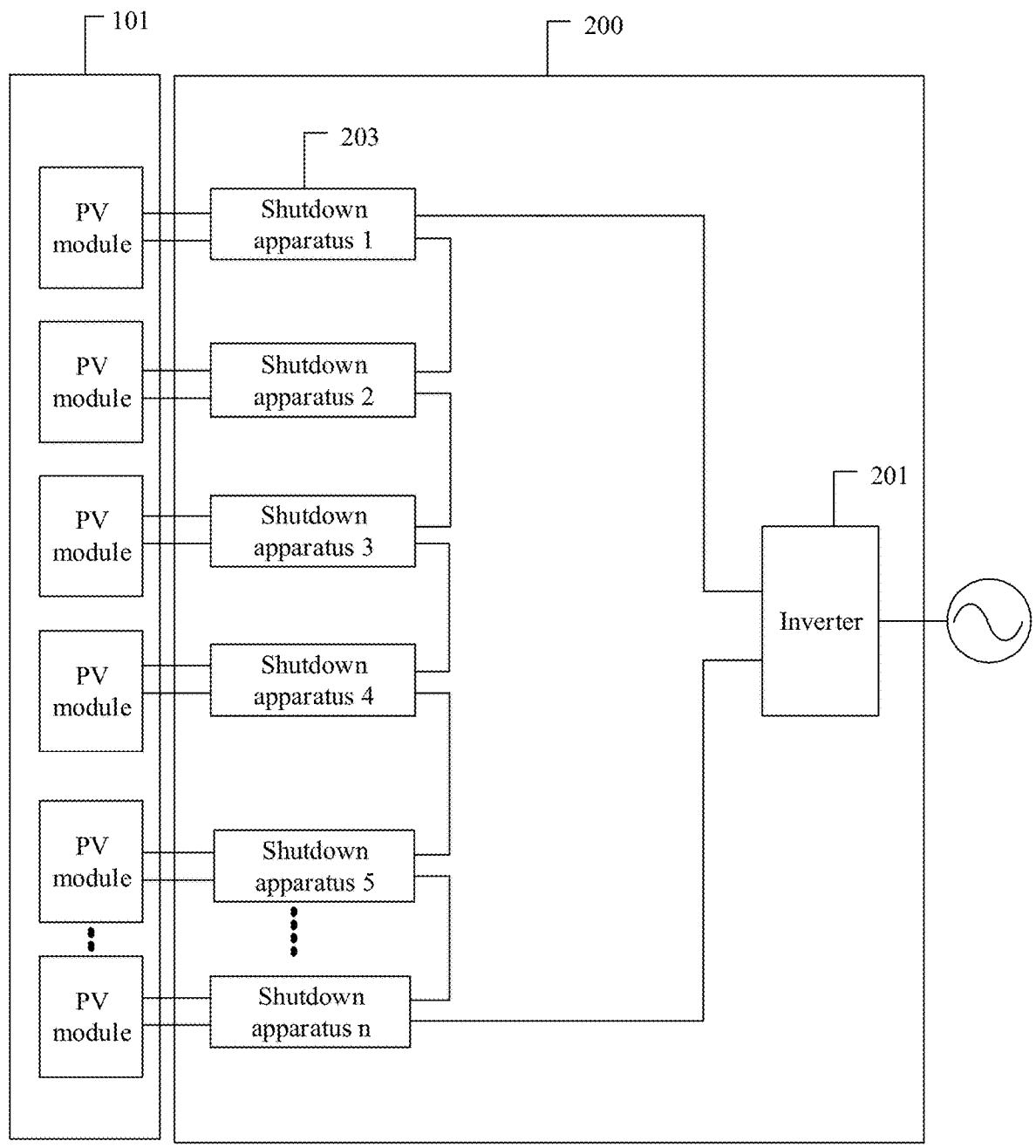
FIG. 3 is a schematic diagram of a photovoltaic power generation system according to an embodiment of this application.
Figure 4:
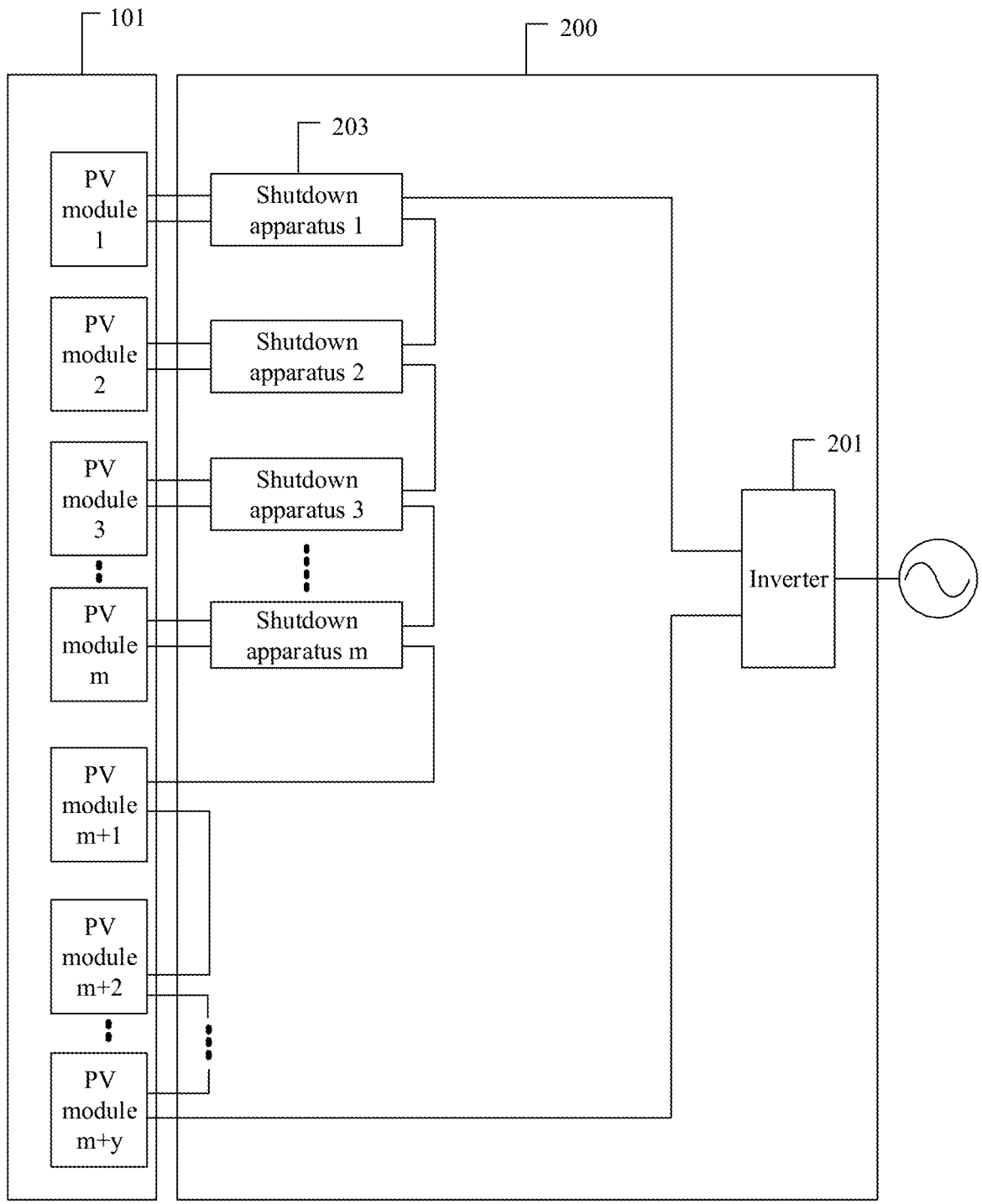
FIG. 4 is a schematic diagram of a photovoltaic power generation system according to an embodiment of this application.

The following describes the first case with reference to FIG. 3, and describes the second case with reference to FIG. 4. For ease of description, in this embodiment of this application, a PV string 101 is used as an example for description.

FIG. 3 is a schematic diagram of a photovoltaic power generation system according to an embodiment of this application.

A photovoltaic power generation system 200 includes an inverter 201 and n shutdown apparatuses 203, where n is an integer greater than or equal to 1.

Output ends of all the PV modules are connected to corresponding shutdown apparatuses 203, and output ends of all the shutdown apparatuses 203 are connected in series to an input end of the inverter 201. When a parameter of the inverter 201 meets a preset condition, some shutdown apparatuses 203 are turned off, so as to lower an input voltage of the inverter 201.

The preset condition is that the input voltage of the inverter 201 is greater than a first preset voltage, or an input current of the inverter 201 is less than a first preset current. Due to a photovoltaic characteristic, an increase in an output voltage of a PV string causes a decrease in an output current of the PV string. Therefore, the input voltage of the inverter or the input current of the inverter may be used as a parameter for triggering an action of the shutdown apparatus.

The first preset voltage may be set based on an actual application scenario, and the setting of the first preset voltage needs to ensure safety of the inverter. A value of the first preset voltage is not specifically limited in this embodiment.

The first preset current may be set based on an actual application scenario. A value of the first preset current is not specifically limited in this embodiment.

The following describes a working principle of the photovoltaic power generation system provided in this embodiment by using an example in which a shutdown apparatus 1 to a shutdown apparatus 4 are turned off.

The input voltage of the inverter 201 is a sum of output voltages of the n shutdown apparatuses. Output voltages of the shutdown apparatus 1 to the shutdown apparatus 4 are lowered due to turn-off of the shutdown apparatus 1 to the shutdown apparatus 4, and the input voltage of the inverter 201 is lowered compared with that before the shutdown apparatus 1 to the shutdown apparatus 4 are turned off. In addition, energy of a shutdown apparatus 5 to a shutdown apparatus n is input at the input end of the inverter 201, and therefore the photovoltaic power generation system can operate normally.

The following describes the second case with reference to FIG. 4, that is, the output ends of some PV modules are not configured with the shutdown apparatuses.

FIG. 4 is a schematic diagram of a photovoltaic power generation system according to an embodiment of this application.

A photovoltaic power generation system 200 includes an inverter 201 and m shutdown apparatuses 203, where m is an integer greater than or equal to 1. The PV string 101 includes m+y PV modules, where y is an integer greater than or equal to 1.

The PV module includes two parts of PV modules: a first part of PV modules and a second part of PV modules.

The first part of PV modules includes a PV module 1 to a PV module m, and PV modules in this part are configured with shutdown apparatuses. Output ends of the PV module 1 to the PV module m are respectively connected to input ends of the m shutdown apparatuses 203. For example, the PV module 1 is connected to the shutdown apparatus 1, the PV module m is connected to a shutdown apparatus m, and the output ends of all the shutdown apparatuses 203 are connected in series to form a first output end.

The second part of PV modules includes a PV module m+1, a PV module m+2, to a PV module m+y, and PV modules in this part are not configured with the shutdown apparatuses. When y is an integer greater than or equal to 2, all PV modules in the second part of PV modules, namely, the PV module m+1 to the PV module m+y are directly connected in series to form a second output end. The first output end and the second output end are connected in series to the input end of the inverter 201.

FIG. 4 shows only an example. PV modules connected to the shutdown apparatuses are connected in series in sequence, PV modules not connected to the shutdown apparatuses are connected in series, and then the two parts are connected in series. Alternatively, one PV module connected to the shutdown apparatus may be connected to one PV module not connected to the shutdown apparatus, then another PV module connected to the shutdown apparatus may be connected, and so on. In other words, two types of PV modules are connected in a staggered manner.

When the parameter of the inverter 201 meets the preset condition, some shutdown apparatuses 203 are turned off or all the shutdown apparatuses 203 are turned off, so as to lower the input voltage of the inverter 201. After all the shutdown apparatuses 203 are turned off or some shutdown apparatuses 203 are turned off, a shutdown apparatus that is not turned off and the second part of PV modules can ensure that the input end of the inverter 201 has energy input, so that the photovoltaic power generation system can operate normally.

For description of the preset condition, refer to the description corresponding to FIG. 3. Details are not described herein again.

The following describes a working principle of the photovoltaic power generation system provided in this embodiment by using an example in which all the shutdown apparatuses are turned off, that is, m shutdown apparatuses are turned off.

The input voltage of the inverter 201 is a sum of output voltages of the m shutdown apparatuses plus a sum of output voltages of y PV modules. All the shutdown apparatuses are turned off, that is, output voltages of the shutdown apparatus 1 to the shutdown apparatus m are lowered due to turn-off of the shutdown apparatus 1 to the shutdown apparatus m. In this case, the input voltage of the inverter 201 is a sum of the output voltages of the y PV modules. The input voltage of the inverter 201 is lowered compared with that before all the shutdown apparatuses are turned off. In addition, energy of the y PV modules is input at the input end of the inverter 201, and therefore the photovoltaic power generation system can operate normally.

For a specific working principle of turning off some shutdown apparatuses in the photovoltaic power generation system provided in this embodiment, refer to the description corresponding to FIG. 3 and FIG. 4. Details are not described herein again.

The type of the shutdown apparatus in the photovoltaic power generation system provided in this embodiment includes at least one of the shutdown device and the optimizer, that is, may include only the optimizer, include only the shutdown device, or include both the optimizer and the shutdown device. The optimizer is a direct current-direct current DC-DC converter, and can convert a direct current voltage output by the PV module into another direct current voltage for output, where the another direct current voltage is same as or different from the direct current voltage output by the PV module. For example, the optimizer may be a buck circuit or a buck-boost circuit. A specific implementation form of the optimizer is not specifically limited in this application. The following separately describes three forms of the shutdown apparatus with reference to accompanying drawings.

A first form: The type of the shutdown apparatus includes only the optimizer.

The photovoltaic power generation system may include a plurality of optimizers. The following uses two optimizers as an example for description.

Figure 5:
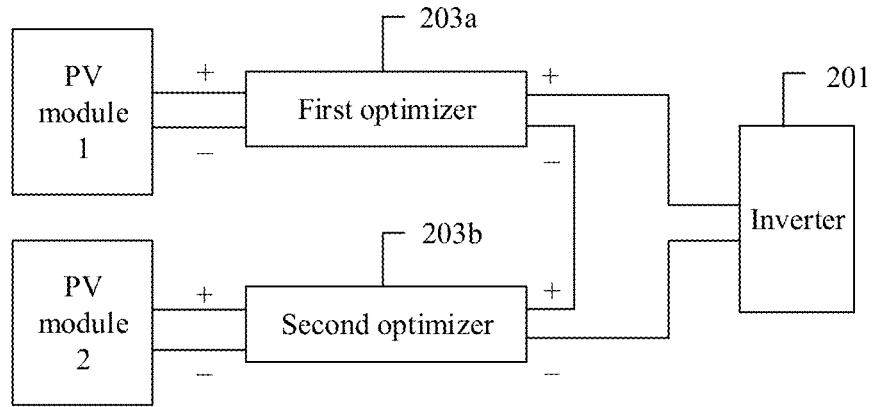
FIG. 5 is a schematic diagram of a shutdown apparatus according to an embodiment of this application.

FIG. 5 is a schematic diagram in which a type of a shutdown apparatus is an optimizer according to an embodiment of this application.

A positive output end of the PV module 1 and a negative output end of the PV module 1 are respectively connected to a positive input end of a first optimizer 203*a* and a negative input end of the first optimizer 203*a*, a positive output end of a PV module 2 and a negative output end of the PV module 2 are respectively connected to a positive input end of a second optimizer 203*b* and a negative input end of the second optimizer 203*b*, a negative output end of the first optimizer 203*a* is connected to a positive output end of the second optimizer 203*b*, a positive output end of the first optimizer 203*a* is connected to a positive input end of the inverter 201, and a negative output end of the second optimizer 203*b* is connected to a negative input end of the inverter 201.

When being turned on, the first optimizer 203*a* is configured to output a corresponding voltage based on a voltage of the PV module 1. When being turned on, the second optimizer 203*b* is configured to output a corresponding voltage based on a voltage of the PV module 2.

A sum of output voltages of all optimizers is the input voltage of the inverter, and the optimizer may adjust an output voltage of the optimizer based on the output voltage of the PV module, so as to adjust the input voltage of the inverter.

A second form: The type of the shutdown apparatus includes only the shutdown device.

The photovoltaic power generation system may include a plurality of shutdown devices. The following uses two shutdown devices as an example for description.

Figure 6:
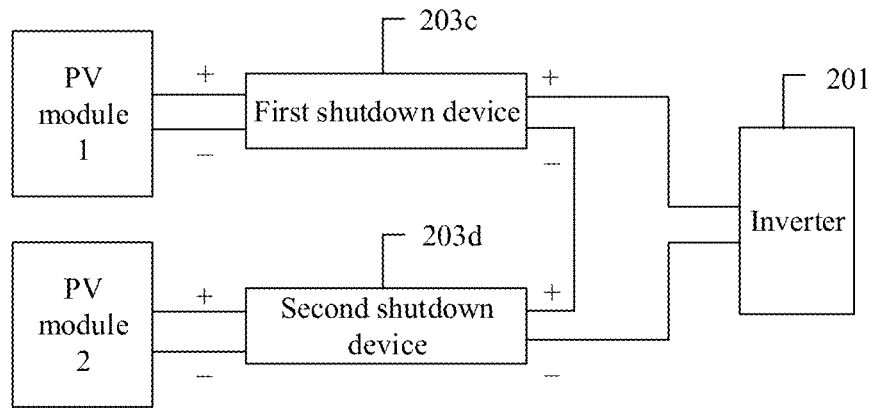
FIG. 6 is a schematic diagram of another shutdown apparatus according to an embodiment of this application.

FIG. 6 is a schematic diagram in which a type of a shutdown apparatus is a shutdown device according to an embodiment of this application.

A positive output end of the PV module 1 and a negative output end of the PV module 1 are respectively connected to a positive input end of a first shutdown device 203c and a negative input end of the first shutdown device 203c, a positive output end of a PV module 2 and a negative output end of the PV module 2 are respectively connected to a positive input end of a second shutdown device 203d and a negative input end of the second shutdown device 203d, a negative output end of the first shutdown device 203c is connected to a positive output end of the second shutdown device 203d, a positive output end of the first shutdown device 203c is connected to a positive input end of the inverter 201, and a negative output end of the second shutdown device 203d is connected to a negative input end of the inverter 201.

When being turned on, the first shutdown device 203a is configured to output a voltage of the PV module 1. When being turned on, the second shutdown device 203d is configured to output a voltage of the PV module 2.

Because the shutdown device may be a mechanical switch or a semiconductor switch, and the optimizer is generally a DC-DC converter, costs of the shutdown device are lower than costs of the optimizer, and a person skilled in the art may configure a specific quantity of the optimizer and the shutdown device based on an actual requirement, so as to reduce costs.

A third form: The type of the shutdown apparatus includes both the optimizer and the shutdown device.

The type of the shutdown apparatus includes the optimizer and the shutdown device. The following uses an example in which the photovoltaic power generation system includes one optimizer and one shutdown device for description.

Figure 7:
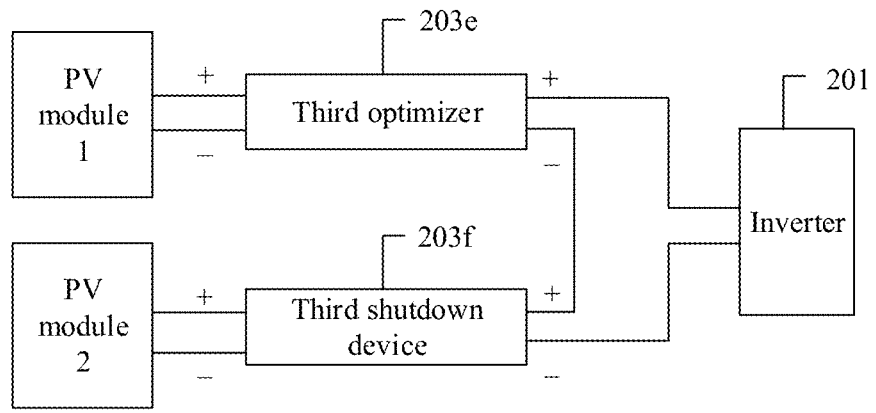
FIG. 7 is a schematic diagram of still another shutdown apparatus according to an embodiment of this application.

FIG. 7 is a schematic diagram in which a type of a shutdown apparatus is a shutdown device and an optimizer according to an embodiment of this application.

A positive output end of the PV module 1 and a negative output end of the PV module 1 are respectively connected to a positive input end of a third optimizer 203e and a negative input end of a third optimizer 203e, a positive output end of a PV module 2 and a negative output end of the PV module 2 are respectively connected to a positive input end of a third shutdown device 203f and a negative input end of the third shutdown device 203f, a negative output end of the third optimizer 203e is connected to a positive output end of the third shutdown device 203f, a positive output end of the third optimizer 203e is connected to a positive input end of the inverter 201, and a negative output end of the third shutdown device 203f is connected to a negative input end of the inverter 201.

When being turned on, the first optimizer 203e is configured to output a corresponding voltage based on a voltage of the PV module 1. When being turned on, the third shutdown device 203f is configured to output a voltage of the PV module 2.

A person skilled in the art may select a corresponding shutdown apparatus based on an actual application scenario of the PV module to meet an actual requirement, and a hardware topology of the shutdown apparatus is not specifically limited in this embodiment. For example, the hardware topology of the shutdown apparatus may include the following six types.

A first type: When all the PV modules are configured with the shutdown apparatuses, the type of the shutdown apparatus includes only the optimizer. A second type: When all the PV modules are configured with the shutdown apparatuses, the type of the shutdown apparatus includes only the shutdown device. A third type: When all the PV modules are configured with the shutdown apparatuses, the type of the shutdown apparatus includes the optimizer and the shutdown device. A fourth type: When some PV modules are not configured with the shutdown apparatuses, the type of the shutdown apparatus includes only the optimizer. A fifth type: When some PV modules are not configured with the shutdown apparatuses, the type of the shutdown apparatus includes only the shutdown device. A sixth type: When some PV modules are not configured with the shutdown apparatuses, the type of the shutdown apparatus includes the optimizer and the shutdown device.

Figure 8:
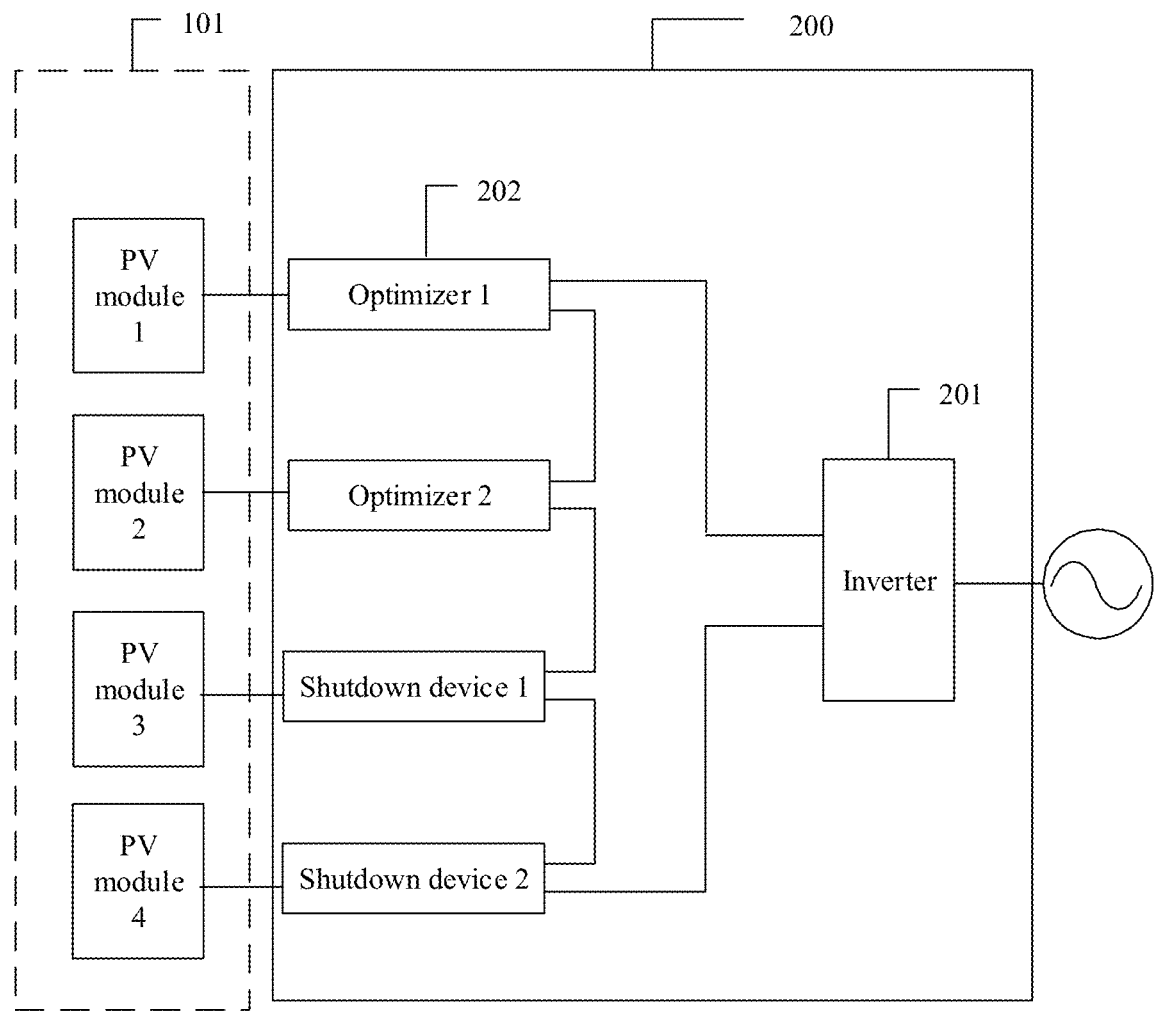
FIG. 8 is a schematic diagram of still another photovoltaic power generation system according to an embodiment of this application.
Figure 9:
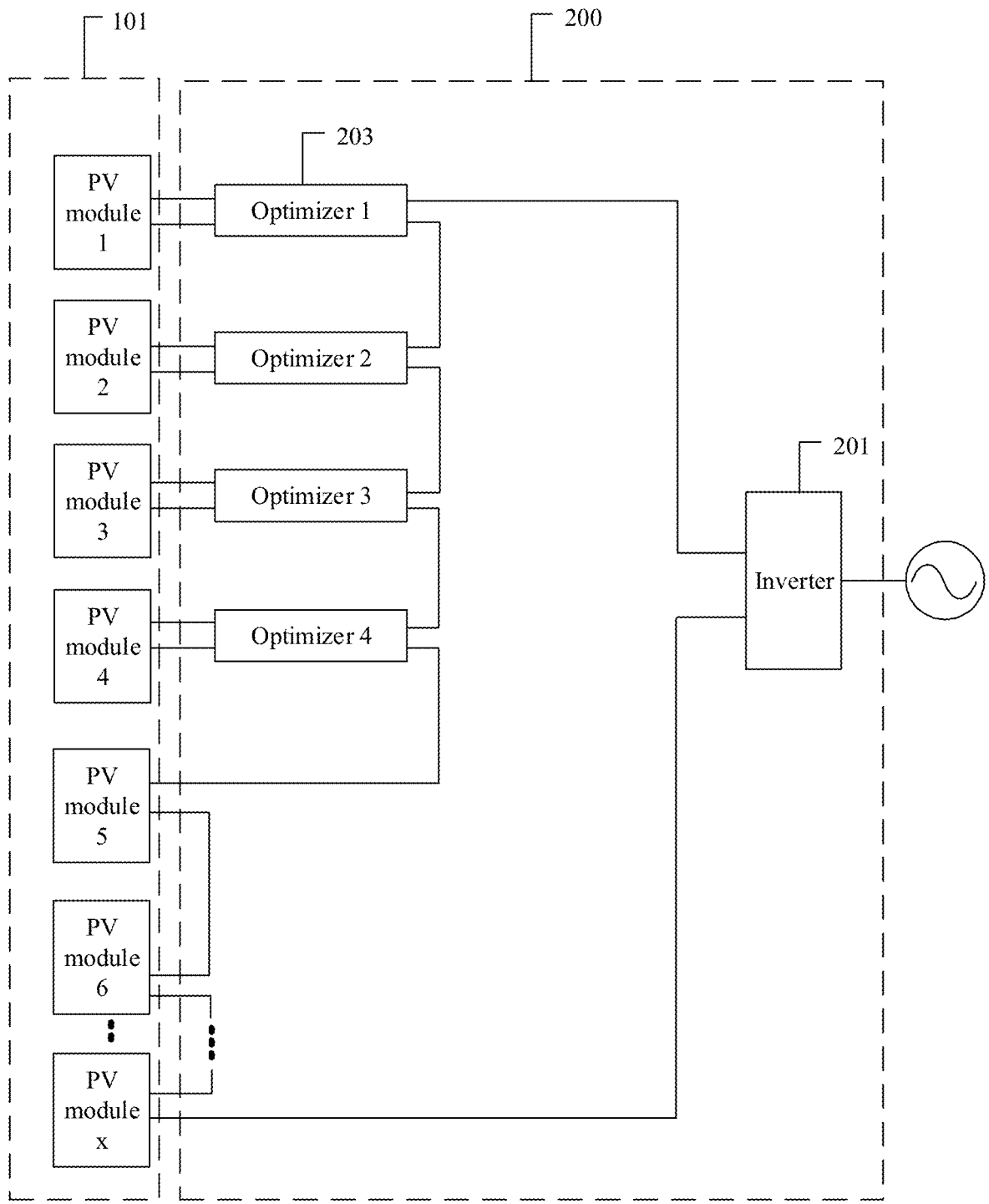
FIG. 9 is a schematic diagram of still another photovoltaic power generation system according to an embodiment of this application.
Figure 10:
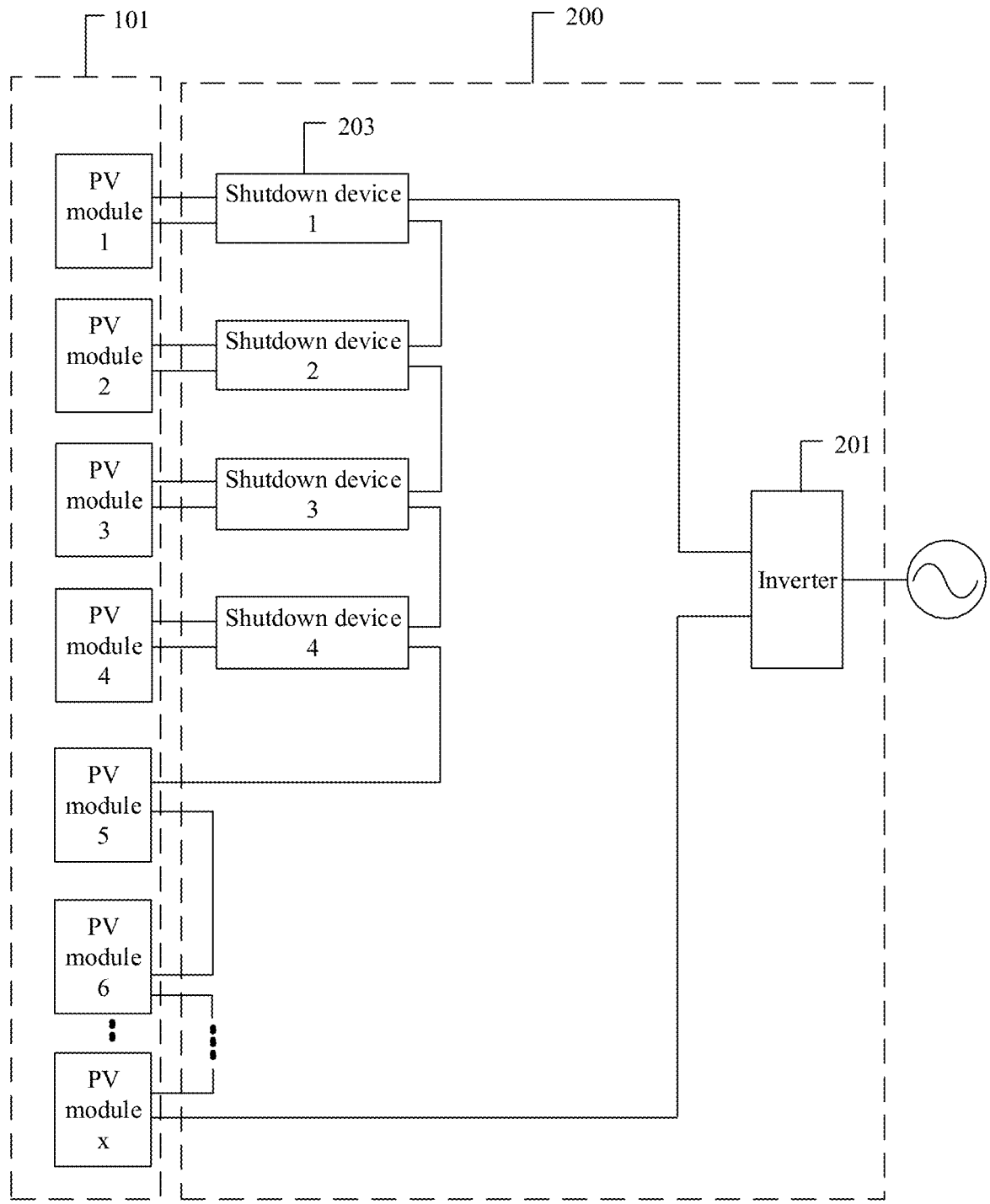
FIG. 10 is a schematic diagram of another photovoltaic power generation system according to an embodiment of this application.
Figure 11:
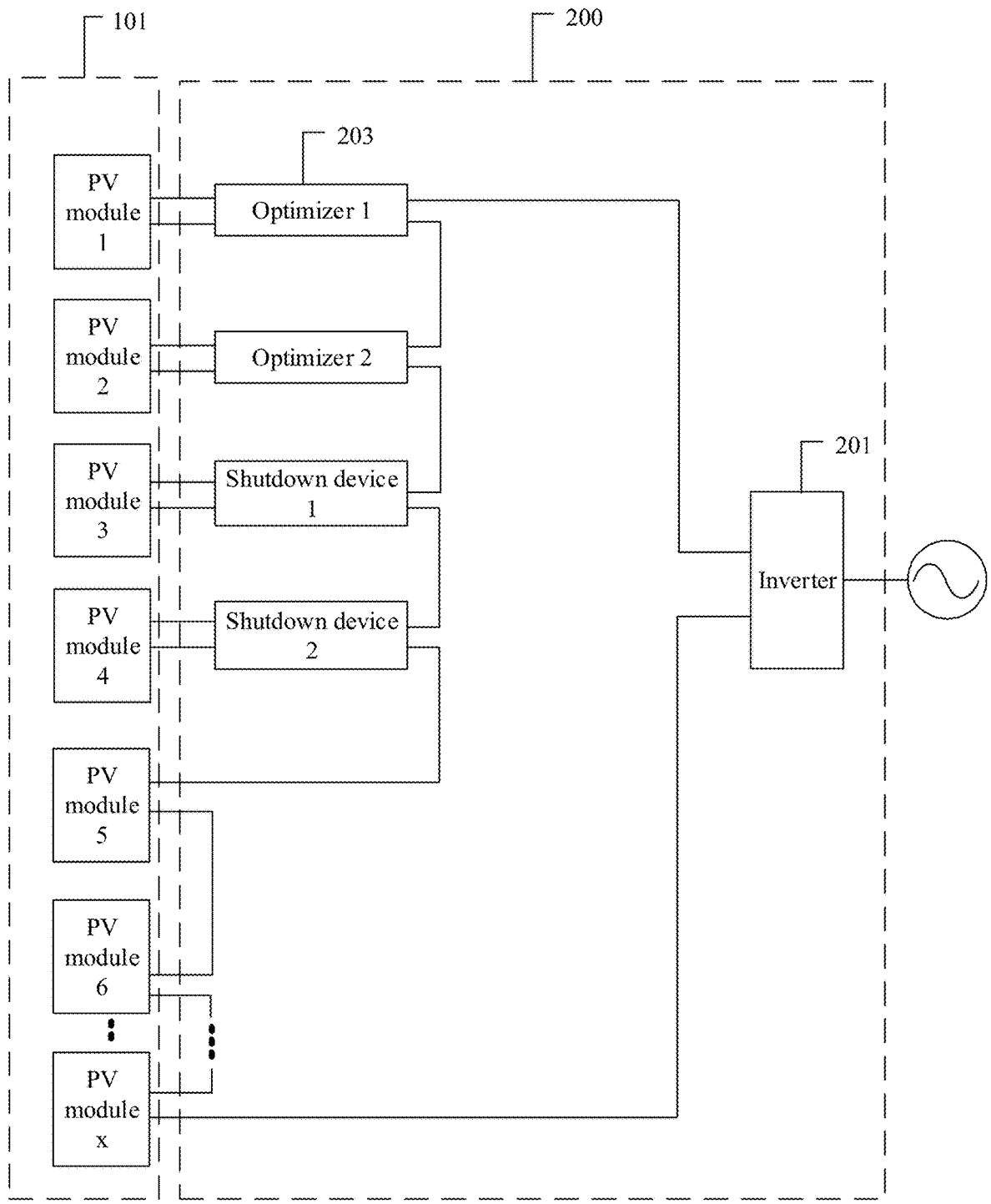
FIG. 11 is a schematic diagram of still another photovoltaic power generation system according to an embodiment of this application.

The following describes the third type with reference to FIG. 8, the fourth type with reference to FIG. 9, the fifth type with reference to FIG. 10, and the sixth type with reference to FIG. 11.

FIG. 8 is a schematic diagram of a photovoltaic power generation system according to an embodiment of this application.

The photovoltaic power generation system includes four shutdown apparatuses: two optimizers and two shutdown devices. Input ends of an optimizer 1 and an optimizer 2 are respectively connected to output ends of the PV module 1 and the PV module 2, input ends of a shutdown device 1 and a shutdown device 2 are respectively connected to output ends of a PV module 3 and a PV module 4, and an output end of the optimizer 1, an output end of the optimizer 2, an output end of the shutdown device 1, and an output end of the shutdown device 2 are connected to connect to the input end of the inverter.

When the parameter of the inverter meets the preset condition, some optimizers are turned off or some shutdown devices are turned off, and the input voltage of the inverter is lowered. However, the input end of the inverter continues to have the direct current input, so as to ensure that the input voltage of the inverter is not excessively high, and the photovoltaic power generation system can operate normally.

FIG. 9 is a schematic diagram of a photovoltaic power generation system according to an embodiment of this application.

The photovoltaic power generation system includes four shutdown apparatuses: four optimizers. Input ends of an optimizer 1 to an optimizer 4 are respectively connected to output ends of the PV module 1 to the PV module 4, and output ends of the optimizer 1 to the optimizer 4 are connected in series to form the first output end. Output ends of a PV module 5, and a PV module 6 to a PV module x are directly connected in series to form the second output end, and the first output end is connected to the input end of the inverter after being connected to the second output end, where x is an integer greater than 6.

When the parameter of the inverter meets the preset condition, some optimizers are turned off or all the optimizers are turned off, and the input voltage of the inverter is lowered. However, the input end of the inverter continues to have the direct current input, so as to ensure that the input voltage of the inverter does not exceed a safe voltage, and the photovoltaic power generation system can operate normally.

FIG. 10 is a schematic diagram of another photovoltaic power generation system according to an embodiment of this application.

The photovoltaic power generation system includes four shutdown apparatuses, four of which are shutdown devices. Input ends of the shutdown device 1 to a shutdown device 4 are respectively connected to the output ends of the PV module 1 to the PV module 4, and output ends of the shutdown device 1 to the shutdown device 4 are connected in series to form the first output end. Output ends of a PV module 5, and a PV module 6 to a PV module x are directly connected in series to form the second output end, and the first output end is connected to the input end of the inverter after being connected to the second output end, where x is an integer greater than 6.

When the parameter of the inverter meets the preset condition, some shutdown devices are turned off or all shutdown devices are turned off, and the input voltage of the inverter is lowered. However, the input end of the inverter continues to have the direct current input, so as to ensure that the input voltage of the inverter does not exceed a safe voltage, and the photovoltaic power generation system can operate normally.

FIG. 11 is a schematic diagram of still another photovoltaic power generation system according to an embodiment of this application.

In this embodiment, an example in which the photovoltaic power generation system includes four shutdown apparatuses is used. The four shutdown apparatuses are two optimizers and two shutdown devices. Input ends of an optimizer 1 and an optimizer 2 are respectively connected to output ends of the PV module 1 and the PV module 2, input ends of a shutdown device 1 and a shutdown device 2 are respectively connected to output ends of a PV module 3 and a PV module 4, and an output end of the optimizer 1, an output end of the optimizer 2, an output end of the shutdown device 1, and an output end of the shutdown device 2 are connected in series to form the first output end. Output ends of a PV module 5, and a PV module 6 to a PV module x are directly connected in series to form the second output end, and the first output end is connected to the input end of the inverter after being connected to the second output end, where x is an integer greater than 6.

When the parameter of the inverter meets the preset condition, some shutdown devices are turned off or all shutdown devices are turned off, and the input voltage of the inverter is lowered. However, the input end of the inverter continues to have the direct current input, so as to ensure that the input voltage of the inverter does not exceed a safe voltage, and the photovoltaic power generation system can operate normally.

A person skilled in the art may select different photovoltaic power generation systems provided in the foregoing embodiments based on the actual application scenario of the PV module.

By using the foregoing photovoltaic power generation system, when the parameter of the inverter meets the preset condition, the input voltage of the inverter exceeds the safe voltage, and the shutdown apparatus is turned off to lower the input voltage of the inverter. However, the input end of the inverter continues to have the direct current input, so as to ensure that the input voltage of the inverter does not exceed the safe voltage, and the photovoltaic power generation system can operate normally.

Embodiment 2 of a Photovoltaic Power Generation System

In this embodiment, a controller is used to control turn-off of a shutdown apparatus to lower an input voltage of an inverter. The controller may be integrated with the inverter, may be integrated with the shutdown apparatus, or may be independent of the inverter and the shutdown apparatus.

The following uses an example in which the controller is added to Embodiment 1 of a photovoltaic power generation system for description.

Figure 12:
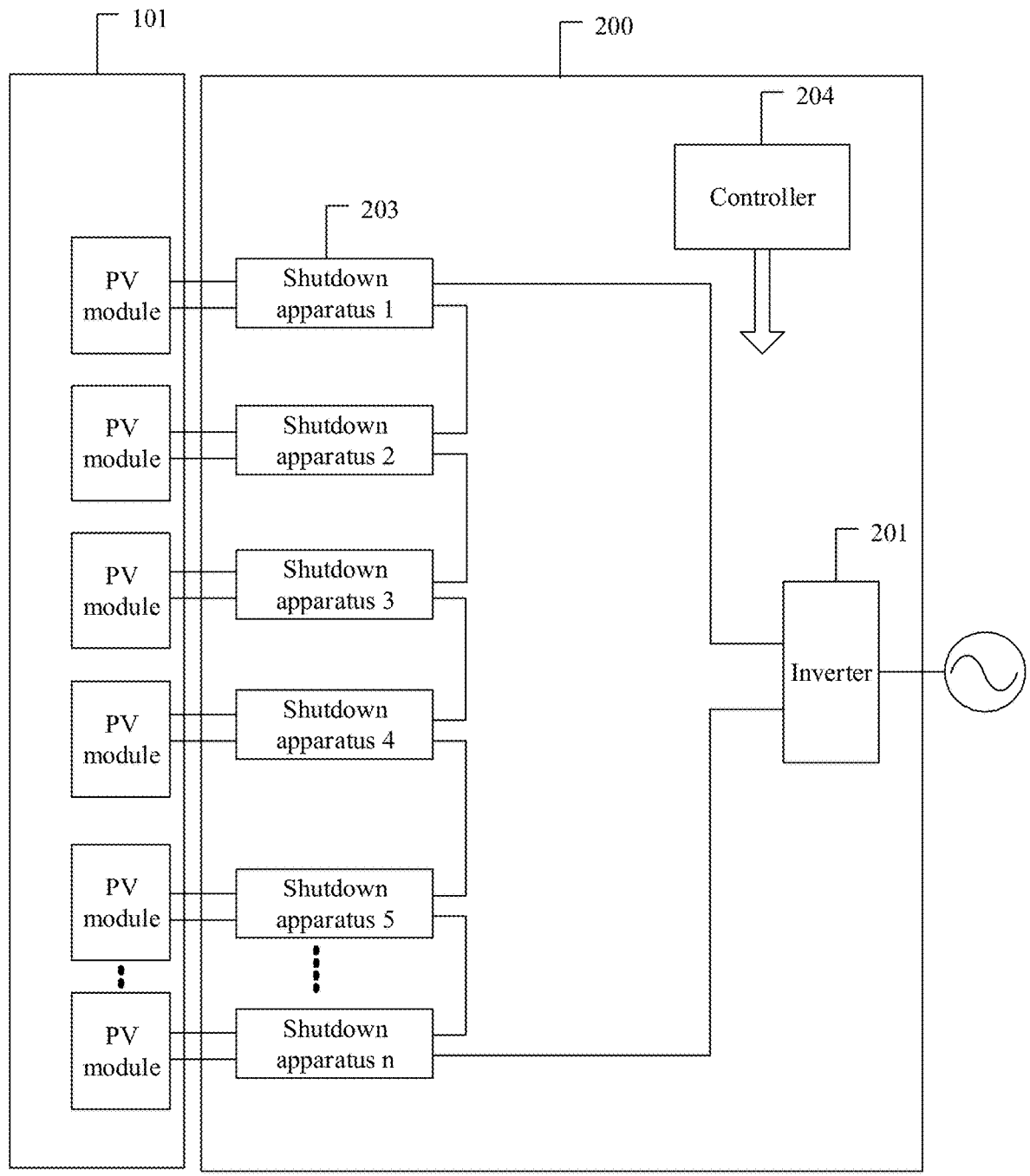
FIG. 12 is a schematic diagram of still another photovoltaic power generation system according to an embodiment of this application.

FIG. 12 is a schematic diagram of still another photovoltaic power generation system according to an embodiment of this application.

A photovoltaic power generation system 200 provided in this embodiment includes an inverter 201, a shutdown apparatus 203, and a controller 204. When the inverter meets that an input voltage of the inverter is greater than a second preset voltage and less than a first preset voltage, the controller 204 can control the shutdown apparatus 203 to be turned off, so as to ensure that the input voltage of the inverter does not exceed a safe voltage, and the photovoltaic power generation system can operate normally.

The second preset voltage may be set based on an actual application scenario, and the second preset voltage is less than the first preset voltage. A value of the second preset voltage is not specifically limited in this embodiment.

A type of the shutdown apparatus 203 in this embodiment includes an optimizer and a shutdown device. The following describes a working principle of the photovoltaic power generation system by using an example in which the photovoltaic power generation system includes two optimizers and two shutdown devices.

Figure 13:
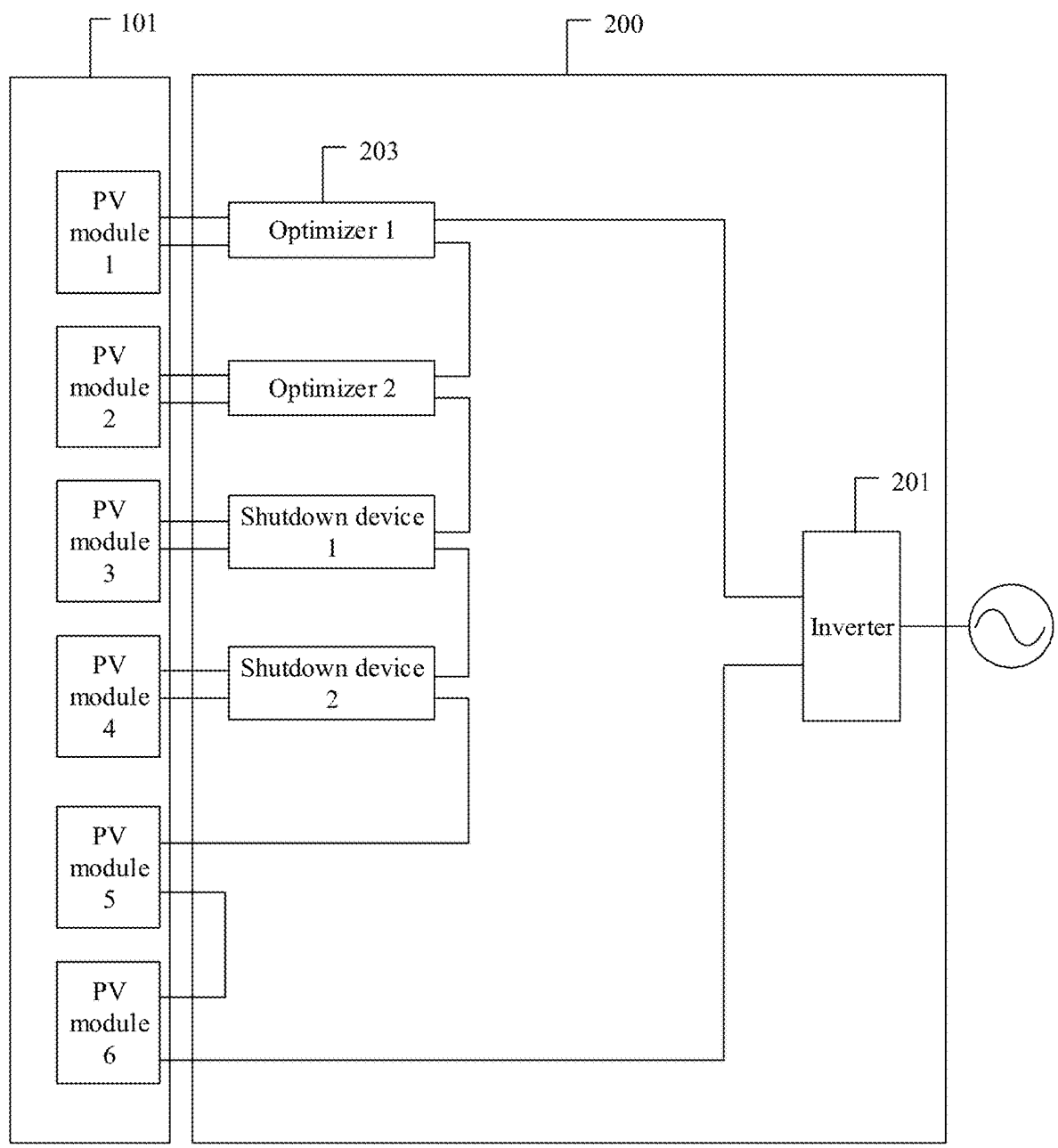
FIG. 13 is a schematic diagram of another photovoltaic power generation system according to an embodiment of this application.

FIG. 13 is a schematic diagram of another photovoltaic power generation system according to an embodiment of this application.

An output end of a PV module 1 and an output end of a PV module 2 are respectively connected to an input end of an optimizer 1 and an input end of an optimizer 2, an output end of a PV module 3 and an output end of a PV module 4 are respectively connected to an input end of a shutdown device 1 and an input end of a shutdown device 2, and an output end of the optimizer 1, an output end of the optimizer 2, an output end of the shutdown device 1, an output end of the shutdown device 2, an output end of a PV module 5, and an output end of a PV module 6 are connected in series to an input end of the inverter 201.

The input voltage of the inverter is a sum of an output voltage of the optimizer 1, an output voltage of the optimizer 2, an output voltage of the shutdown device 1, an output voltage of the shutdown device 2, an output voltage of the PV module 5, and an output voltage of the PV module 6. Therefore, when an input voltage of the inverter 201 is greater than the second preset voltage and less than the first preset voltage, the controller 204 adjusts at least one of the output voltage of the optimizer 1 and the output voltage of the optimizer 2, so as to lower the input voltage of the inverter 201.

A manner in which the controller 204 adjusts the optimizer is not specifically limited in this embodiment. For example, the controller 204 may lower a direct current voltage output by the PV module to another direct current voltage for output, or the controller 204 may directly turn off the optimizer.

After the controller 204 adjusts the output voltage of the optimizer, the input voltage of the inverter may not decrease below the second preset voltage, but may exceed the first preset voltage instead, or an input current of the inverter may be less than a first preset current. In this case, at least one of the shutdown device 1 and the shutdown device 2 is turned off to lower the input voltage of the inverter 201.

When the shutdown device is turned off, an output voltage of the shutdown device that is turned off is suddenly lowered, and then the input voltage of the inverter is suddenly lowered accordingly. This causes impact on the inverter. The output voltage of the optimizer may be adjusted smoothly step by step, instead of directly turning off the output like the shutdown device. Therefore, the controller 204 adjusts the optimizer first, so that the input voltage of the inverter can be smoothly lowered, making the inverter more stable.

After controlling the shutdown apparatus to be turned off, the controller can further control the shutdown apparatus to be turned on. A manner in which the controller controls the shutdown apparatus to be turned on is not specifically limited in this embodiment. For example, when the input voltage of the inverter is less than the first preset voltage or a current at an input end of the inverter is greater than the first preset current, the controller sends a control instruction to the shutdown apparatus, so that the shutdown apparatus is turned on.

By using the foregoing photovoltaic power generation system, the shutdown apparatus includes both the shutdown device and the optimizer. When a parameter of the inverter meets a preset condition, the input voltage of the inverter exceeds the safe voltage, and the controller controls the output voltage of the optimizer to be lowered, so as to lower the input voltage of the inverter. In addition, the input end of the inverter continues to have a direct current input, so as to ensure that the input voltage of the inverter does not exceed the safe voltage, and the photovoltaic power generation system can operate normally.

Embodiment 3 of a Photovoltaic Power Generation System

The photovoltaic power generation system not only can turn off a shutdown apparatus based on a parameter of an inverter, but also can turn off the shutdown apparatus based on a parameter of the shutdown apparatus.

The photovoltaic power generation system provided in this embodiment includes the inverter and at least one shutdown apparatus. When a parameter of the shutdown apparatus meets a preset condition, the shutdown apparatus is turned off, so as to lower an input voltage of the inverter. However, not all PV modules are disconnected from the inverter, and an input end of the inverter continues to have a direct current input, so that the photovoltaic power generation system can continue to operate normally.

There may be two cases based on whether all the PV modules are configured with shutdown apparatuses. For details, refer to FIG. 3 or FIG. 4. Similarities are not described herein again.

The input voltage of the inverter is a sum of output voltages of the shutdown apparatuses plus a sum of voltages of PV modules that are not configured with the shutdown apparatuses. Therefore, the shutdown apparatus not only can be turned off based on the input voltage of the inverter or an input current of the inverter, but also can be turned off based on the parameter of the shutdown apparatus.

When the parameter of the shutdown apparatus meets the preset condition, the shutdown apparatus is turned off, that is, when a voltage of the shutdown apparatus is greater than a preset threshold voltage or a current of the shutdown apparatus is less than a preset threshold current, the shutdown apparatus is turned off, so as to lower the input voltage of the inverter.

The preset threshold voltage and the preset threshold current may be set based on an actual application scenario, and setting of the preset threshold voltage and the preset threshold current needs to ensure safety of the inverter. A value of the preset threshold voltage and a value of the preset threshold current are not specifically limited in this embodiment.

The following separately describes a working principle of the photovoltaic power generation system provided in this embodiment with reference to FIG. 3 and FIG. 4.

Due to a photovoltaic characteristic, an increase in an output voltage of a PV string causes a decrease in an output current of the PV string. Therefore, the shutdown apparatus is turned off based on the fact that the voltage of the shutdown apparatus is greater than the preset threshold voltage, and this is the same as a working principle of the shutdown apparatus based on the fact that the current of the shutdown apparatus is less than the preset threshold current.

The following uses an example in which the shutdown apparatus is turned off based on the fact that the voltage of the shutdown apparatus is greater than the preset threshold voltage for description.

Refer to FIG. 3. When the voltage of the shutdown apparatus is greater than the preset threshold voltage, some shutdown apparatuses are turned off, an output voltage of a shutdown apparatus that is turned off is lowered, and the input voltage of the inverter is lowered. In addition, a shutdown apparatus that is not turned off supplies the direct current to the input end of the inverter, and the input end of the inverter continues to have the direct current input, so that the photovoltaic power generation system can continue to operate normally.

Refer to FIG. 4. When the voltage of the shutdown apparatus is greater than the preset threshold voltage, some shutdown apparatuses are turned off or all the shutdown apparatuses are turned off, an output voltage of the shutdown apparatus that is turned off is lowered, and the input voltage of the inverter is lowered. In addition, at least one of the shutdown apparatus that is not turned off and a PV module that is not configured with the shutdown apparatus supplies the direct current to the input end of the inverter, so that the photovoltaic power generation system can continue to operate normally.

By using the foregoing photovoltaic power generation system, when the parameter of the shutdown apparatus meets the preset condition, the shutdown apparatus is turned off to lower the input voltage of the inverter, and the input end of the inverter continues to have the direct current input, so as to ensure that the input voltage of the inverter does not exceed a safe voltage, and the photovoltaic power generation system can operate normally.

Embodiment 4 of a Photovoltaic Power Generation System

When a voltage of a shutdown apparatus is greater than a preset threshold voltage or a current of a shutdown apparatus is less than a preset threshold current, some shutdown apparatuses are turned off or all shutdown apparatuses are turned off. A shutdown device is turned on when a preset condition is not met.

The voltage of the shutdown apparatus may include an input voltage or an output voltage of the shutdown apparatus, and the current of the shutdown apparatus may include an input current or an output current of the shutdown apparatus.

An output voltage of a shutdown apparatus that is turned off is lowered, an input voltage of an inverter is lowered, and at least one of a shutdown apparatus that is not turned off and a PV module that is not configured with the shutdown apparatus supplies a direct current to an input end of the inverter, so that the photovoltaic power generation system can continue to operate normally.

A type of the shutdown apparatus in the photovoltaic power generation system provided in this embodiment of this application includes at least one of a shutdown device and an optimizer, that is, includes only the optimizer, includes only the shutdown device, or includes both the optimizer and the shutdown device.

The following uses an example in which the shutdown apparatus includes the shutdown device and the optimizer for description.

The voltage of the shutdown apparatus is the input voltage of the shutdown apparatus or the output voltage of the shutdown apparatus, and the current of the shutdown apparatus is the input current of the shutdown apparatus or the output current of the shutdown apparatus.

The preset threshold voltage of the shutdown apparatus includes two types: a preset shutdown threshold voltage and a preset optimizer threshold voltage. A preset threshold voltage corresponding to the shutdown device is the preset shutdown threshold voltage, and a preset threshold voltage corresponding to the optimizer is the preset optimizer threshold voltage.

A value of the preset optimizer threshold voltage and a value of the preset shutdown threshold voltage are not specifically limited in this embodiment. Whether the preset optimizer threshold voltage is the same as the preset shutdown threshold voltage is not specifically limited in this embodiment. The preset optimizer threshold voltage and the preset shutdown threshold voltage may be the same or different.

The following describes the preset optimizer threshold voltage and the preset shutdown threshold voltage separately.

The preset optimizer threshold voltage is set for each optimizer in the photovoltaic power generation system, and when an input voltage or an output voltage of the optimizer is greater than the preset optimizer threshold voltage, the output voltage of the optimizer is adjusted. For example, when an input voltage of an optimizer 1 is greater than the preset optimizer threshold voltage, an output voltage of the optimizer 1 is adjusted, so as to lower the input voltage of the inverter.

When the photovoltaic power generation system has at least two optimizers, preset optimizer threshold voltages corresponding to the at least two optimizers are different, and different optimizers may be adjusted by using different preset optimizer threshold voltages. For example, a voltage of an optimizer that is greater than the preset optimizer threshold voltage at an earlier time is adjusted first, and a voltage of an optimizer that is greater than the preset optimizer threshold voltage at a later time is adjusted later.

For example, the output voltage of the optimizer 1 is greater than a preset optimizer threshold voltage of the optimizer 1 at an earlier time, and an output voltage of the optimizer 2 is greater than a preset optimizer threshold voltage of the optimizer 2 at a later time. In this case, a controller 204 adjusts the optimizer 1 first and adjusts the optimizer 2 later.

The preset optimizer threshold voltages corresponding to the at least two optimizers in the photovoltaic power generation system are different in magnitude, so that at least one optimizer in the photovoltaic system has the output voltage, so as to ensure that the input end of the inverter continues to have the direct current input, and the photovoltaic system can operate normally.

The preset optimizer threshold voltage is described above, and the preset shutdown threshold voltage is described below.

The preset shutdown threshold voltage is set for each shutdown device in the photovoltaic power generation system, and when an input voltage of the shutdown device or an output voltage of the shutdown device is greater than the preset shutdown threshold voltage, the shutdown device is turned off. For example, when an input voltage of a shutdown device 1 is greater than the preset shutdown threshold voltage, the shutdown device is turned off, so as to lower the input voltage of the inverter.

When the photovoltaic power generation system has at least two shutdown devices, preset shutdown threshold voltages corresponding to the at least two shutdown devices are different in magnitude, and different shutdown devices may be adjusted by using different preset shutdown threshold voltages. For example, the shutdown device whose voltage is greater than the preset shutdown threshold voltage at an earlier time is turned off first, and the shutdown device whose voltage is greater than the preset shutdown threshold voltage at a later time is turned off later.

The following describes a working principle of the shutdown apparatus with reference to an internal current diagram of the shutdown apparatus, and internal circuit diagrams of four types of optimizers are first described with reference to FIG. 14 to FIG. 17, respectively. The optimizer and the shutdown device in all the foregoing embodiments may use a structure shown in the following circuit diagram.

Type 1

Figure 14:
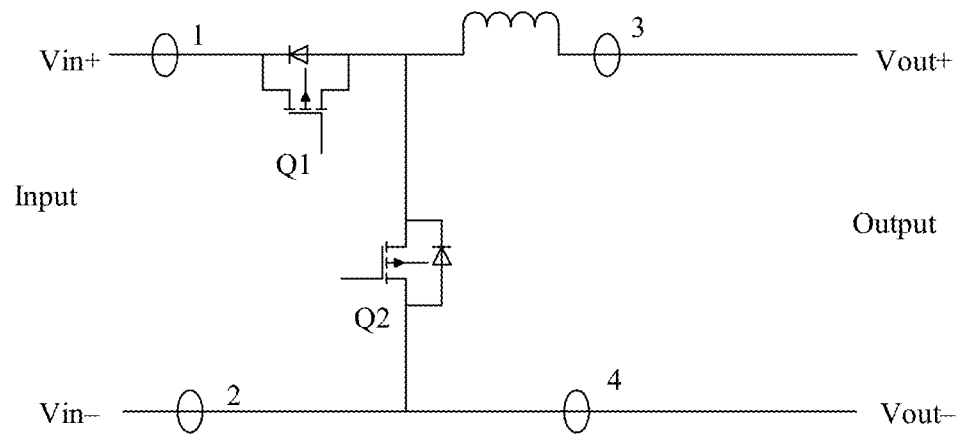
FIG. 14 is a circuit diagram of an optimizer according to an embodiment of this application.

FIG. 14 is a circuit diagram of an optimizer according to an embodiment of this application.

A first end of a first switching transistor Q1 is connected to a positive input end Vin+ of the optimizer, a second end of the first switching transistor Q1 is connected to a first end of an inductor L1, a second end of the inductor L1 is connected to a positive output end Vout+ of the optimizer, a first end of a second switching transistor Q2 is connected to a common end of the first switching transistor Q1 and the inductor L1, and a second end of the second switching transistor Q2 is connected to a negative output end Vout− of the optimizer.

Input voltage sampling points of the optimizer are Vin+ and Vin−, and output voltage sampling points of the optimizer are Vout+ and Vout−. Output current sampling points of the optimizer are a position 3 and a position 4.

Type 2

Figure 15:
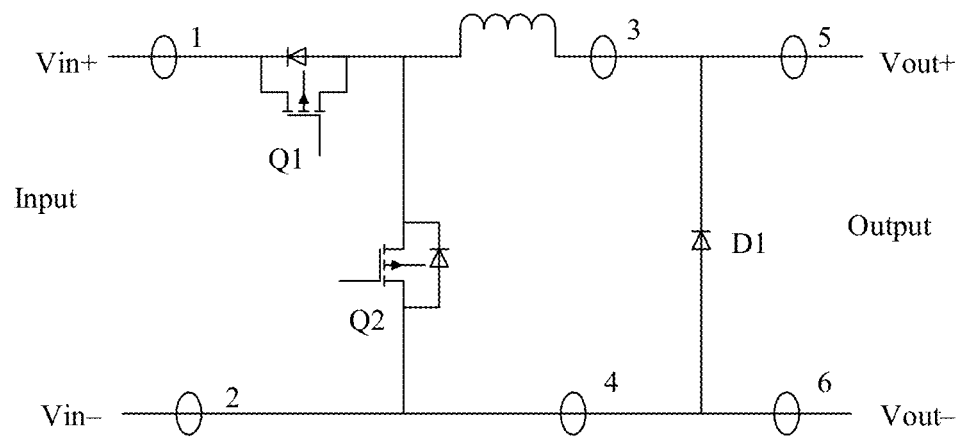
FIG. 15 is a circuit diagram of another optimizer according to an embodiment of this application.

FIG. 15 is a circuit diagram of another optimizer according to an embodiment of this application.

Compared with FIG. 14, a first diode D1 is added to the optimizer provided in this embodiment, and the first diode D1 is connected in parallel to the positive output end of the optimizer and a negative output end of the optimizer. For other similarities, refer to FIG. 14. Details are not described herein again.

Input voltage sampling points of the optimizer are Vin+ and Vin−, and output voltage sampling points of the optimizer are Vout+ and Vout−. Output current sampling points of the optimizer are a position 3 to a position 6.

Type 3

Figure 16:
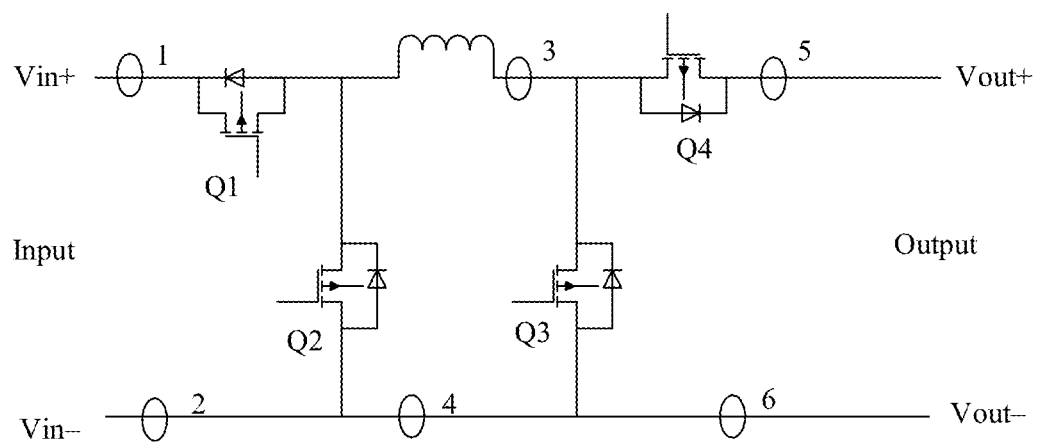
FIG. 16 is a circuit diagram of still another optimizer according to an embodiment of this application.

FIG. 16 is a circuit diagram of still another optimizer according to an embodiment of this application.

Compared with FIG. 14, two switching transistors are added to the optimizer provided in this embodiment. A first end of a third switching transistor Q3 and a fourth switching transistor are connected in series to a positive output end Vout+ of the optimizer, and a second end of the third switching transistor is connected to a negative output end Vout− of the optimizer. For other similarities, refer to FIG. 14. Details are not described herein again.

Input voltage sampling points of the optimizer are Vin+ and Vin−, and output voltage sampling points of the optimizer are Vout+ and Vout−. Output current sampling points of the optimizer are a position 3 to a position 8.

Type 4

Figure 17:
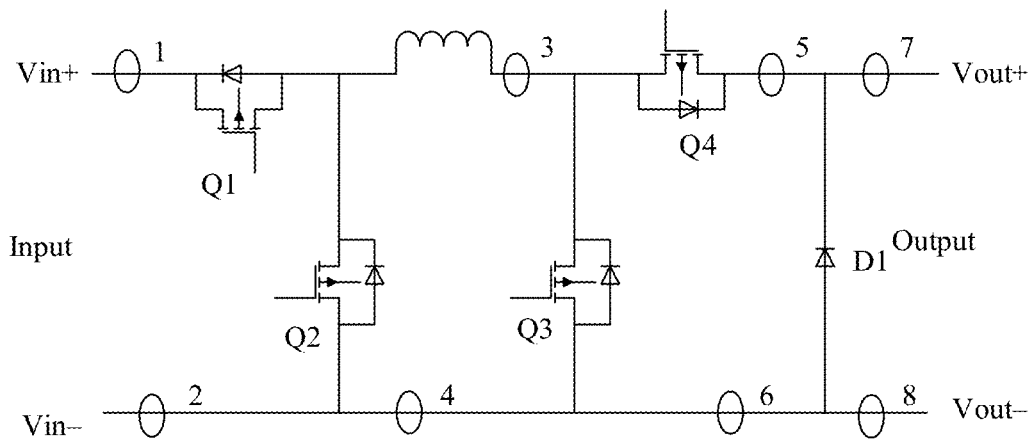
FIG. 17 is a circuit diagram of still another optimizer according to an embodiment of this application.

FIG. 17 is a circuit diagram of still another optimizer according to an embodiment of this application.

Compared with FIG. 16, a first diode D1 is added to the optimizer provided in this embodiment, and the diode D1 is connected in parallel to both a positive output end Vout+ of the optimizer and a negative output end Vout− of the optimizer. For other similarities, refer to FIG. 16. Details are not described herein again.

Input voltage sampling points of the optimizer are Vin+ and Vin−, and output voltage sampling points of the optimizer are Vout+ and Vout−. Output current sampling points of the optimizer are a position 3 to a position 6.

When a PV module is shielded by an object such as tree shade, a fallen leaf, dust, bird droppings, or a cloud, an internal resistance of the shaded PV module increases, and an output current of the PV module decreases, so that maximum output power of the PV module decreases. After the shaded PV module is connected to the optimizer, the optimizer tracks the maximum output power of the PV module in real time, and adjusts the output voltage of the optimizer and an output current of the optimizer based on a requirement of the photovoltaic power generation system, so as to ensure that the PV module outputs the maximum power when the PV module is shaded, and output power of another PV module is not affected.

Internal circuit diagrams of two types of shutdown devices are described below with reference to FIG. 18 and FIG. 19, respectively.

Figure 18:
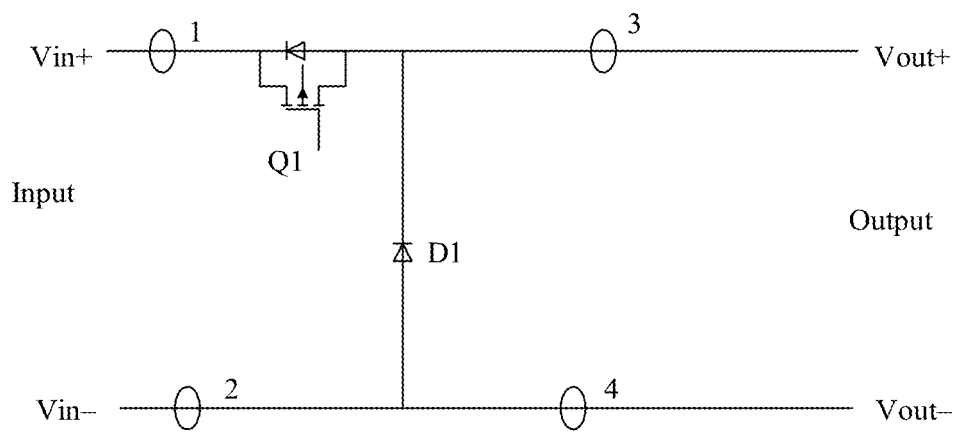
FIG. 18 is a circuit diagram of a shutdown device according to an embodiment of this application.

FIG. 18 is a circuit diagram of a shutdown device according to an embodiment of this application.

The shutdown device includes a first switching transistor Q1 and a first diode D1. A first end of the first switching transistor Q1 is connected to a positive electrode Vin+ of the PV module, and a second end of the first switching transistor Q1 is connected to a positive output end Vout+ of the shutdown device. A cathode of the first diode D1 is connected to the positive output end Vout+ of the shutdown device, and an anode of the first diode D1 is connected to a negative output terminal Vout− of the shutdown device. FIG. 18 shows only an example in which the first end of the Q1 is connected to the Vin+. In addition, there is another possible implementation: The first end of the Q1 is connected to the Vout−, and the second end of the Q1 is connected to the negative output end Vin−.

When the shutdown device is turned off, the first switching transistor Q1 is turned off, and an output voltage of a PV module connected to the shutdown device is lowered, and the input voltage of the inverter is lowered. Because the first diode D1 is turned on when the first switching transistor Q1 is turned off, output power of another PV module in a same string is not affected.

When the shutdown device is turned on, the first switching transistor Q1 is turned on, and energy output by the PV module connected to the shutdown device can be normally transferred to the inverter.

Input voltage sampling points of the shutdown device are Vin+ and Vin−, output voltage sampling points of the shutdown device are Vout+ and Vout−, and output current sampling points of the shutdown device are a position 3 and a position 4.

A function of the output power of the another PV module in the same string is not affected when the shutdown device is turned off. In this case, a diode may be used, and a switching transistor may be alternatively used. Description is provided below with reference to FIG. 19.

Figure 19:
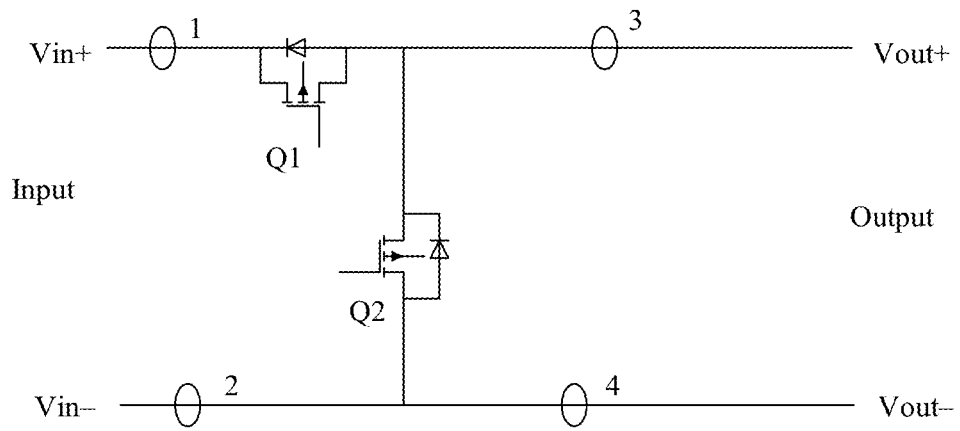
FIG. 19 is a circuit diagram of another shutdown device according to an embodiment of this application.

FIG. 19 is a circuit diagram of another shutdown device according to an embodiment of this application.

The shutdown device includes a first switching transistor Q1 and a second switching transistor Q2. A first end of the first switching transistor Q1 is connected to a positive electrode Vin+ of a PV module, and a second end of the first switching transistor Q1 is connected to a positive output end Vout+ of the shutdown device. A first end of the second switching transistor Q2 is connected to the positive output end Vout+ of the shutdown device, and a second end of the second switching transistor Q2 is connected to a negative output end Vout− of the shutdown device. The second switching transistor includes an anti-parallel diode.

When the shutdown device is turned off, the first switching transistor Q1 is turned off, the second switching transistor Q2 is turned on, and the second switching transistor Q2 is equivalent to a first diode D1 in FIG. 18. Other similarities with FIG. 18 are not described herein again.

When the shutdown device is turned on, the first switching transistor Q1 is turned on, the second switching transistor Q2 is turned off, and energy output by a PV module connected to the shutdown device can be normally transferred to the inverter.

Input voltage sampling points of the shutdown device are Vin+ and Vin−, output voltage sampling points of the shutdown device are Vout+ and Vout+, and output current sampling points of the shutdown device are a position 3 and a position 4.

Still refer to FIG. 13. For example, the output voltage of a shutdown device 1 is greater than a preset shutdown threshold voltage of the shutdown device 1 at an earlier time, and an output voltage of a shutdown device 2 is greater than a preset shutdown threshold voltage of the shutdown device 2 at a later time. In this case, the shutdown device 1 is turned off first, and the shutdown device 2 is turned off later.

The preset shutdown threshold voltages corresponding to the at least two shutdown devices in the photovoltaic power generation system are different in magnitude, so that at least one shutdown device in the photovoltaic system has the output voltage, so as to ensure that the input end of the inverter continues to have the direct current input, and the photovoltaic system can operate normally.

The shutdown device not only can turn itself off based on the input voltage or the output voltage of the shutdown device, but also can turn itself off based on an output current of the shutdown device.

Due to a photovoltaic characteristic, an output voltage of a PV string and an output current of the PV string have a negative correlation relationship, so that the shutdown device not only can turn itself off when the input voltage or the output voltage of the shutdown device is greater than the preset shutdown threshold voltage, but also can turn itself off when the output current of the shutdown device is less than the preset shutdown threshold current.

Specifically, the shutdown device is turned off when the output current of the shutdown device is less than a first preset shutdown threshold current.

Similarly, first preset shutdown threshold currents corresponding to the at least two shutdown devices are different in magnitude, and similarities are not described again. For details, refer to the working principle in which the shutdown device turns itself off based on the fact that the input voltage or the output voltage of the shutdown device is greater than the preset shutdown threshold voltage.

After being turned off, the shutdown device can be turned on again. Specifically, the shutdown device is turned on when the output current of the shutdown device is greater than a second preset shutdown threshold current.

Similarly, second preset shutdown threshold currents corresponding to the at least two shutdown devices are different in magnitude. For details, refer to the working principle in which the shutdown device is turned off when the output current of the shutdown device is less than the first preset shutdown threshold current.

Magnitudes of the first preset shutdown threshold current and the second preset shutdown threshold current are not specifically limited in this embodiment. The first preset shutdown threshold current and the second preset shutdown threshold current may be equal or not equal. When the first preset shutdown threshold current and the second preset shutdown threshold current are not equal, the second preset shutdown threshold current is greater than the first preset shutdown threshold current.

A current that triggers turn-on of the shutdown device and a current that triggers turn-off of the shutdown device are different for convenience of setting a particular return difference. For example, when the output current of the shutdown device is less than 3 amperes, the shutdown device is turned off. When the output current of the shutdown device is greater than 5 amperes, the shutdown device is turned on.

By using the foregoing photovoltaic power generation system, the type of the shutdown apparatus includes the optimizer and the shutdown device. When a parameter of the shutdown apparatus meets the preset condition, the shutdown apparatus is turned off to lower the input voltage of the inverter. In addition, the input end of the inverter continues to have the direct current input, so as to ensure that the input voltage of the inverter does not exceed a safe voltage, and the photovoltaic power generation system can operate normally.

Embodiment 1 of a Photovoltaic Power Generation Control Method

Based on the photovoltaic power generation system provided in the foregoing embodiments, this application further provides a photovoltaic power generation control method, which is applied to the foregoing photovoltaic power generation system.

For specific description of the photovoltaic power generation system, refer to the foregoing embodiments. Details are not described herein again in this embodiment.

Figure 20:
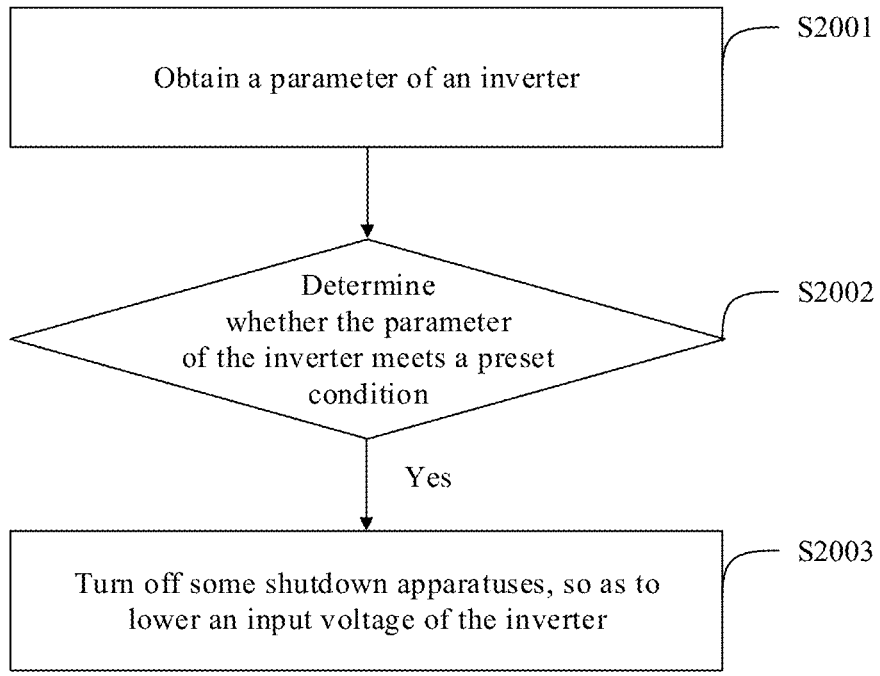
FIG. 20 is a flowchart of a photovoltaic power generation control method corresponding to FIG. 3.

FIG. 20 is a flowchart of a photovoltaic power generation control method corresponding to FIG. 3.

Operation S2001: Obtain a parameter of an inverter.

The parameter of the inverter may include an input voltage of the inverter, an input current of the inverter, and the like. The obtained parameter of the inverter is not specifically limited in this embodiment.

Operation S2002: Determine whether the parameter of the inverter meets a preset condition.

The preset condition is that the input voltage of the inverter is greater than a first preset voltage or the input current of the inverter is less than a first preset current.

When the obtained parameter of the inverter is the input voltage of the inverter, it is determined whether the input voltage of the inverter is greater than the first preset voltage. The first preset voltage may be set based on an actual application scenario, and setting of the first preset voltage needs to ensure safety of the inverter. A value of the first preset voltage is not specifically limited in this embodiment.

When the obtained parameter of the inverter is the input current of the inverter, it is determined whether the input current of the inverter is less than the first preset current. The first preset current may be set based on an actual application scenario. A value of the first preset current is not specifically limited in this embodiment.

Operation S2003: If the parameter of the inverter meets the preset condition, turn off some shutdown apparatuses, so as to lower the input voltage of the inverter.

When the input voltage of the inverter is greater than the first preset voltage or the input current of the inverter is less than the first preset current, some shutdown apparatuses are turned off to lower the input voltage of the inverter. A shutdown device that is not turned off can supply a direct current to an input end of the inverter, so as to ensure that the photovoltaic power generation system can operate normally.

Figure 21:
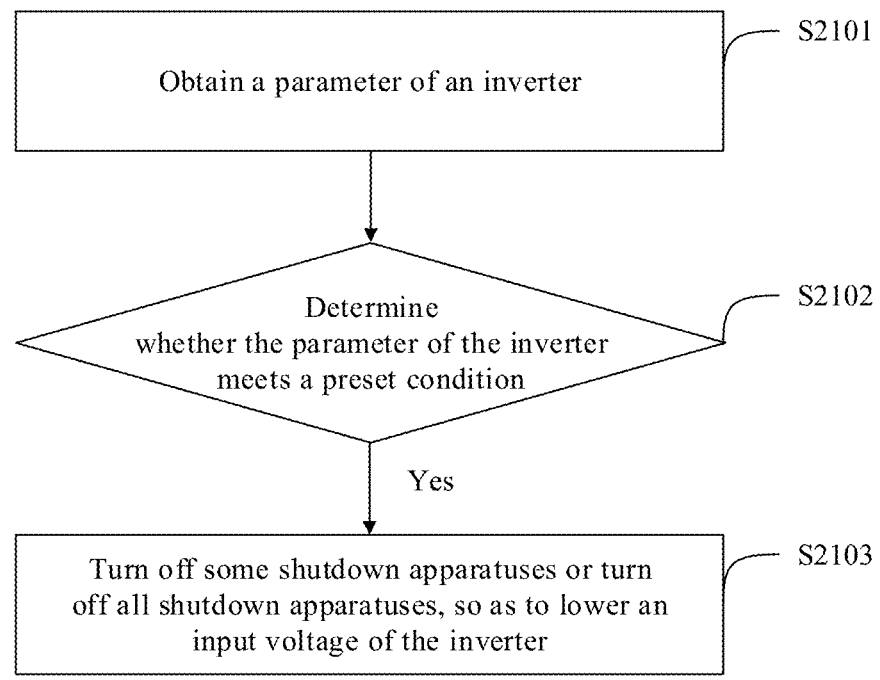
FIG. 21 is a flowchart of a photovoltaic power generation control method corresponding to FIG. 4.

FIG. 21 is a flowchart of a photovoltaic power generation control method corresponding to FIG. 4.

Operation S2101: Obtain a parameter of an inverter.

The parameter of the inverter may include an input voltage of the inverter, an input current of the inverter, and the like. The obtained parameter of the inverter is not specifically limited in this embodiment.

Operation S2102: Determine whether the parameter of the inverter meets a preset condition.

The preset condition is that the input voltage of the inverter is greater than a first preset voltage or the input current of the inverter is less than a first preset current.

When the obtained parameter of the inverter is the input voltage of the inverter, it is determined whether the input voltage of the inverter is greater than the first preset voltage. The first preset voltage may be set based on an actual application scenario, and setting of the first preset voltage needs to ensure safety of the inverter. A value of the first preset voltage is not specifically limited in this embodiment.

When the obtained parameter of the inverter is the input current of the inverter, it is determined whether the input current of the inverter is less than the first preset current. The first preset current may be set based on an actual application scenario, and setting of the first preset current needs to ensure safety of the inverter. A value of the first preset current is not specifically limited in this embodiment.

Operation S2103: If the parameter of the inverter meets the preset condition, turn off some shutdown apparatuses or turn off all shutdown apparatuses, so as to lower the input voltage of the inverter.

When the input voltage of the inverter is greater than the first preset voltage or the input current of the inverter is less than the first preset current, some shutdown apparatuses or all the shutdown apparatuses are turned off to lower the input voltage of the inverter. At least one of a shutdown apparatus that is not turned off and a PV module that is not configured with the shutdown apparatus can supply a direct current to an input end of the inverter, so as to ensure that the photovoltaic power generation system can operate normally.

By using the foregoing photovoltaic power generation control method, when the parameter of the inverter meets the preset condition, the input voltage of the inverter exceeds a safe voltage, and the shutdown apparatus is turned off to lower the input voltage of the inverter. In addition, the input end of the inverter continues to have the direct current input, so as to ensure that the input voltage of the inverter does not exceed the safe voltage, and the photovoltaic power generation system can operate normally.

The shutdown apparatus includes at least one of an optimizer and a shutdown device, that is, the shutdown apparatus includes only the optimizer, the shutdown apparatus includes only the shutdown device, and the shutdown apparatus includes both the optimizer and the shutdown device.

When the shutdown apparatus includes the optimizer and the shutdown device, the foregoing method further includes adjusting an output voltage of the optimizer when the input voltage of the inverter is greater than a second preset voltage and less than the first preset voltage, so as to lower the input voltage of the inverter. The second preset voltage is less than the first preset voltage.

The second preset voltage may be set based on an actual application scenario, and the second preset voltage is less than the first preset voltage. A value of the second preset voltage is not specifically limited in this embodiment.

By using the foregoing photovoltaic power generation control method, when the input voltage of the inverter is greater than the second preset voltage and less than the first preset voltage, the output voltage of the optimizer is adjusted, and the output voltage of the optimizer may be adjusted smoothly step by step, instead of directly turning off the output like the shutdown device. Therefore, the optimizer is adjusted first, so that the input voltage of the inverter can be smoothly lowered, making the inverter more stable.

Embodiment 2 of a Photovoltaic Power Generation Control Method

According to the photovoltaic power generation control method, a shutdown apparatus can be turned off not only based on a parameter of an inverter, but also based on a parameter of the shutdown apparatus.

Figure 22:
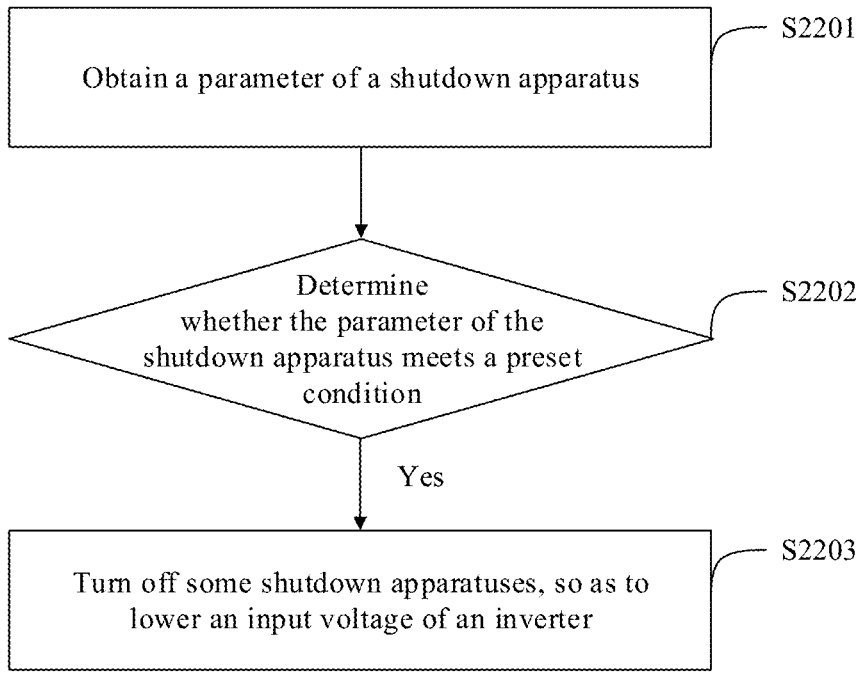
FIG. 22 is a flowchart of another photovoltaic power generation control method corresponding to FIG. 3.

FIG. 22 is a flowchart of another photovoltaic power generation control method corresponding to FIG. 3.

Operation S2201: Obtain the parameter of the shutdown apparatus.

The parameter of the shutdown apparatus may include a voltage of the shutdown apparatus, a current of the shutdown apparatus, and the like. The parameter of the shutdown apparatus is not specifically limited in this embodiment.

The voltage of the shutdown apparatus includes an input voltage or an output voltage of the shutdown apparatus, and the current of the shutdown apparatus includes an input current or an output current of the shutdown apparatus.

Because a type of the shutdown apparatus is at least one of an optimizer and a shutdown device, the parameter of the shutdown apparatus may be one or more of an input voltage of the optimizer, an output voltage of the optimizer, an input current of the optimizer, an output current of the optimizer, an input voltage of the shutdown device, an output voltage of the shutdown device, an input current of the shutdown device, and an output current of the shutdown device.

Operation S2202: Determine whether the parameter of the shutdown apparatus meets a preset condition.

The preset condition is that the voltage of the shutdown apparatus is greater than a preset threshold voltage or the current of the shutdown apparatus is less than a preset threshold current.

When the obtained parameter of the shutdown apparatus is the voltage of the shutdown apparatus, it is determined whether the voltage of the shutdown apparatus is greater than the preset threshold voltage.

When the obtained parameter of the shutdown apparatus is the current of the shutdown apparatus, it is determined whether the current of the shutdown apparatus is less than the preset threshold current.

Because the type of the shutdown apparatus is the at least one of the optimizer and the shutdown device, the preset threshold voltage includes a preset optimizer threshold voltage and a preset shutdown threshold voltage, and the preset threshold current includes a preset optimizer threshold current and a preset shutdown threshold current.

Operation S2203: If the parameter of the shutdown apparatus meets the preset condition, turn off some shutdown apparatuses, so as to lower an input voltage of the inverter.

If the voltage of the shutdown apparatus is greater than the preset threshold voltage or the current of the shutdown apparatus is less than the preset threshold current, some shutdown apparatuses are turned off, so as to lower the input voltage of the inverter. A shutdown device that is not turned off can supply a direct current to an input end of the inverter, so as to ensure that a photovoltaic power generation system can operate normally.

Figure 23:
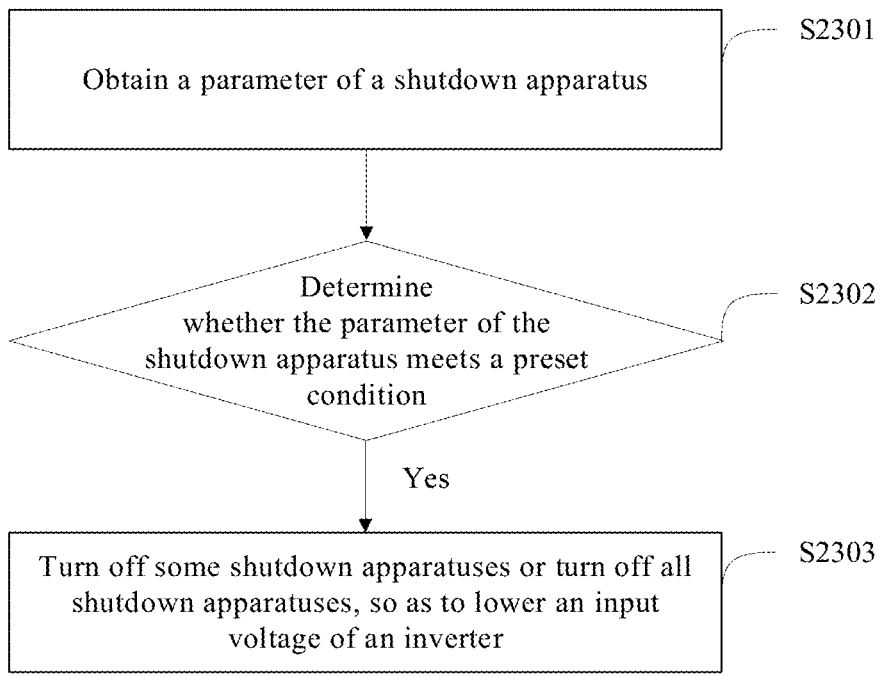
FIG. 23 is a flowchart of another photovoltaic power generation control method corresponding to FIG. 4.

FIG. 23 is a flowchart of another photovoltaic power generation control method corresponding to FIG. 4.

Operation S2301: Obtain the parameter of the shutdown apparatus.

The parameter of the shutdown apparatus may include a voltage of the shutdown apparatus, a current of the shutdown apparatus, and the like. The parameter of the shutdown apparatus is not specifically limited in this embodiment.

The voltage of the shutdown apparatus includes an input voltage or an output voltage of the shutdown apparatus, and the current of the shutdown apparatus includes an input current or an output current of the shutdown apparatus.

Because a type of the shutdown apparatus is at least one of an optimizer and a shutdown device, the parameter of the shutdown apparatus may be one or more of an input voltage of the optimizer, an output voltage of the optimizer, an input current of the optimizer, an output current of the optimizer, an input voltage of the shutdown device, an output voltage of the shutdown device, an input current of the shutdown device, and an output current of the shutdown device.

Operation S2302: Determine whether the parameter of the shutdown apparatus meets a preset condition.

The preset condition is that the voltage of the shutdown apparatus is greater than a preset threshold voltage or the current of the shutdown apparatus is less than a preset threshold current.

When the obtained parameter of the shutdown apparatus is the voltage of the shutdown apparatus, it is determined whether the voltage of the shutdown apparatus is greater than the preset threshold voltage.

When the obtained parameter of the shutdown apparatus is the current of the shutdown apparatus, it is determined whether the current of the shutdown apparatus is less than the preset threshold current.

Because the type of the shutdown apparatus is the at least one of the optimizer and the shutdown device, the preset threshold voltage includes a preset optimizer threshold voltage and a preset shutdown threshold voltage, and the preset threshold current includes a preset optimizer threshold current and a preset shutdown threshold current.

Operation S2303: If the parameter of the shutdown apparatus meets the preset condition, turn off some shutdown apparatuses or turn off all shutdown apparatuses, so as to lower an input voltage of the inverter.

If the voltage of the shutdown apparatus is greater than the preset threshold voltage or the current of the shutdown apparatus is less than the preset threshold current, some shutdown apparatuses are turned off, so as to lower the input voltage of the inverter. At least one of a shutdown apparatus that is not turned off and a PV module that is not configured with the shutdown apparatus can supply a direct current to an input end of the inverter, so as to ensure that a photovoltaic power generation system can operate normally.

By using the foregoing photovoltaic power generation control method, when the parameter of the shutdown apparatus meets the preset condition, the input voltage of the inverter exceeds a safe voltage, and the shutdown apparatus is turned off to lower the input voltage of the inverter. In addition, the input electric end of the inverter continues to have the direct current input, so as to ensure that the input voltage of the inverter does not exceed the safe voltage, and the photovoltaic power generation system can operate normally.

It should be understood that in this application, "at least one (item)" means one or more and "a plurality of" means two or more. The term "and/or" is used to describe an association relationship for describing associated objects, and indicates that three relationships may exist. For example, "A and/or B" may represent the following three cases: Only A exists, only B exists, and both A and B exist, where A and B may be singular or plural. The character "/" usually represents an "or" relationship between the associated objects. "At least one of the following items (pieces)" or a similar expression thereof means any combination of these items, including any combination of singular items (pieces) or plural items (pieces). For example, at least one of a, b, and c may represent a, b, c, "a and b", "a and c", "b and c", or "a, b, and c", where a, b, and c may be singular or plural.

The foregoing descriptions are merely example embodiments of this application, and are not intended to limit this application in any form. Although the example embodiments of this application are disclosed above, embodiments are not intended to limit this application. By using the method and the technical content disclosed above, any persons of ordinary skill in the art can make a plurality of possible changes and modifications on the technical solutions of this application, or amend the technical solutions thereof to be embodiments with equal effects through equivalent variations without departing from the protection scope of the technical solutions of this application. Therefore, any simple amendment, equivalent variation, and modification made on the above embodiments according to the technical essence of this application without departing from the content of the technical solutions of this application shall fall within the protection scope of the technical solutions of this application.

What is claimed is:

1. A photovoltaic (PV) power generation system, comprising an inverter and at least one shutdown apparatus, wherein
    a type of the shutdown apparatus is at least one of a shutdown device or an optimizer; an input end of each shutdown apparatus is used to connect to a corresponding PV module, and power of the corresponding PV module is output;
    output ends of all PV modules are connected to corresponding shutdown apparatuses, and output ends of all the shutdown apparatuses are connected in series to an input end of the inverter; when a parameter of the inverter meets a preset condition, some of the shutdown apparatuses are turned off, so as to lower an input voltage of the inverter; and the preset condition is that the input voltage of the inverter is greater than a first preset voltage or an input current of the inverter is less than a first preset current;
    or
    the PV module comprises a first part of PV modules and a second part of PV modules, an output end of each PV module in the first part of PV modules is connected to an input end of a corresponding shutdown apparatus, and output ends of all the shutdown apparatuses are connected in series to form a first output end; the second part of PV modules comprises at least one PV module, and when the second part of PV modules comprises a plurality of PV modules, all PV modules in the second part of PV modules are directly connected in series to form a second output end; the first output end and the second output end are connected in series to an input end of the inverter; and when a parameter of the inverter meets a preset condition, some of the shutdown apparatuses are turned off or all the shutdown apparatuses are turned off, so as to lower an input voltage of the inverter.

2. The system according to claim 1, further comprising a controller, wherein
    the type of the shutdown apparatus comprises the shutdown device and the optimizer; and
    the controller is configured to adjust an output voltage of the optimizer when the input voltage of the inverter is greater than a second preset voltage and less than the first preset voltage, so as to lower the input voltage of the inverter; and the second preset voltage is less than the first preset voltage.

3. The system according to claim 2, wherein the controller is configured to first turn off the shutdown device when the parameter of the inverter meets the preset condition, so as to lower the input voltage of the inverter.

4. The system according to claim 2, wherein the shutdown device comprises a first switching transistor and a first diode;
    a first end of the first switching transistor is connected to a positive electrode of the PV module, and a second end of the first switching transistor is connected to a positive output end of the shutdown device;
    a cathode of the first diode is connected to the positive output end of the shutdown device, and an anode of the first diode is connected to a negative output end of the shutdown device;
    when the shutdown device is turned off, the first switching transistor is turned off; and
    when the shutdown device is turned on, the first switching transistor is turned on.

5. The system according to claim 2, wherein the shutdown device comprises a first switching transistor and a second switching transistor;
    a first end of the first switching transistor is connected to a positive electrode of the PV module, and a second end of the first switching transistor is connected to a positive output end of the shutdown device;

a first end of the second switching transistor is connected to the positive output end of the shutdown device, and a second end of the second switching transistor is connected to a negative output end of the shutdown device;

the second switching transistor comprises an anti-parallel diode;

when the shutdown device is turned off, the first switching transistor is turned off, and the second switching transistor is turned on; and when the shutdown device is turned on, the first switching transistor is turned on, and the second switching transistor is turned off.

6. A photovoltaic (PV) power generation system, comprising an inverter and at least one shutdown apparatus, wherein a type of the shutdown apparatus is at least one of a shutdown device or an optimizer; an input end of each shutdown apparatus is used to connect to a corresponding PV module, and power of the corresponding PV module is output;

output ends of all PV modules are connected to corresponding shutdown apparatuses, and output ends of all the shutdown apparatuses are connected in series to an input end of the inverter; or the PV module comprises a first part of PV modules and a second part of PV modules, an output end of each PV module in the first part of PV modules is connected to an input end of a corresponding shutdown apparatus, and output ends of all the shutdown apparatuses are connected in series to form a first output end; the second part of PV modules comprises at least one PV module, and when the second part of PV modules comprises a plurality of PV modules, all PV modules in the second part of PV modules are directly connected in series to form a second output end; and the first output end and the second output end are connected in series to an input end of the inverter; and the shutdown apparatus is configured to be turned off when a parameter of the shutdown apparatus meets a preset condition, wherein the preset condition is that a voltage of the shutdown apparatus is greater than a preset threshold voltage or a current of the shutdown apparatus is less than a preset threshold current, so as to lower an input voltage of the inverter.

7. The system according to claim 6, wherein the type of the shutdown apparatus comprises a shutdown device and an optimizer; and the voltage of the shutdown apparatus is an input voltage or an output voltage of the shutdown apparatus, and the current of the shutdown apparatus is an input current or an output current of the shutdown apparatus.

8. The system according to claim 7, wherein the preset threshold voltage corresponding to the optimizer is a preset optimizer threshold voltage;

the optimizer is configured to adjust an output voltage of the optimizer when an input voltage or an output voltage of the optimizer is greater than the preset optimizer threshold voltage; and preset optimizer threshold voltages corresponding to at least two optimizers are different in magnitude.

9. The system according to claim 7, wherein the preset threshold voltage corresponding to the shutdown device is a preset shutdown threshold voltage;

the shutdown device is configured to be turned off when an input voltage or an output voltage of the shutdown device is greater than the preset shutdown threshold voltage; and preset shutdown threshold voltages corresponding to at least two shutdown devices are different in magnitude.

10. The system according to claim 7, wherein the shutdown device is further configured to be turned off when an output current of the shutdown device is less than a first preset shutdown threshold current, and is further configured to be turned on when an output current of the shutdown device is greater than a second preset shutdown threshold current; and first preset shutdown threshold currents corresponding to at least two shutdown devices are different in magnitude, second preset shutdown threshold currents corresponding to at least two shutdown devices are different in magnitude, and the first preset shutdown threshold current is less than the second preset shutdown threshold current.

11. The system according to claim 6, wherein the shutdown device comprises a first switching transistor and a first diode;

a first end of the first switching transistor is connected to a positive electrode of the PV module, and a second end of the first switching transistor is connected to a positive output end of the shutdown device;

a cathode of the first diode is connected to the positive output end of the shutdown device, and an anode of the first diode is connected to a negative output end of the shutdown device;

when the shutdown device is turned off, the first switching transistor is turned off; and when the shutdown device is turned on, the first switching transistor is turned on.

12. The system according to claim 6, wherein the shutdown device comprises a first switching transistor and a second switching transistor;

a first end of the first switching transistor is connected to a positive electrode of the PV module, and a second end of the first switching transistor is connected to a positive output end of the shutdown device;

a first end of the second switching transistor is connected to the positive output end of the shutdown device, and a second end of the second switching transistor is connected to a negative output end of the shutdown device;

the second switching transistor comprises an anti-parallel diode;

when the shutdown device is turned off, the first switching transistor is turned off, and the second switching transistor is turned on; and when the shutdown device is turned on, the first switching transistor is turned on, and the second switching transistor is turned off.

13. A photovoltaic power generation control method, comprising:

when a parameter of an inverter of a photovoltaic (PV) power generation system meets a preset condition, turning off a shutdown apparatus of the PV power generation system so as to lower an input voltage of the inverter, wherein a type of the shutdown apparatus is at least one of a shutdown device or an optimizer; an input end of each shutdown apparatus is used to connect to a corresponding PV module, and power of the corresponding PV module is output, wherein output ends of all PV modules are connected to corresponding shutdown apparatuses, and output ends of all the shutdown apparatuses are connected in series to an input end of the inverter; and the preset condition is that the input voltage of the inverter is greater than a first preset voltage or an input current of the inverter is less than a first preset current;

or when a parameter of the inverter meets a preset condition, turning off a subset of the shutdown apparatuses or all of the shutdown apparatuses, so as to lower an input voltage of the inverter, wherein the PV module comprises a first part of PV modules and a second part of PV modules, an output end of each PV module in the first part of PV modules is connected to an input end of a corresponding shutdown apparatus, and output ends of all the shutdown apparatuses are connected in series to form a first output end; the second part of PV modules comprises at least one PV module, and when the second part of PV modules comprises a plurality of PV modules, all PV modules in the second part of PV modules are directly connected in series to form a second output end; the first output end and the second output end are connected in series to an input end of the inverter.

14. The method according to claim 13, further comprising: when the type of the shutdown apparatus includes at least the optimizer, adjusting an output voltage of the optimizer when the input voltage of the inverter is greater than a second preset voltage and less than the first preset voltage, so as to lower the input voltage of the inverter; and the second preset voltage is less than the first preset voltage.

15. A photovoltaic power generation control method, comprising:
turning off a shutdown apparatus of a photovoltaic (PV) power generation system when a parameter of the shutdown apparatus meets a preset condition, wherein the preset condition is that when a voltage of the shutdown apparatus is greater than a preset threshold voltage or a current of the shutdown apparatus is less than a preset threshold current, the shutdown apparatus is turned off, so as to lower an input voltage of an inverter of the PV power generation system, wherein a type of the shutdown apparatus is at least one of a shutdown device or an optimizer; an input end of each shutdown apparatus is used to connect to a corresponding PV module, and power of the corresponding PV module is output;

wherein output ends of all PV modules are connected to corresponding shutdown apparatuses, and output ends of all the shutdown apparatuses are connected in series to an input end of the inverter; or the PV module comprises a first part of PV modules and a second part of PV modules, an output end of each PV module in the first part of PV modules is connected to an input end of a corresponding shutdown apparatus, and output ends of all the shutdown apparatuses are connected in series to form a first output end; the second part of PV modules comprises at least one PV module, and when the second part of PV modules comprises a plurality of PV modules, all PV modules in the second part of PV modules are directly connected in series to form a second output end; and the first output end and the second output end are connected in series to an input end of the inverter.

\* \* \* \* \*